United States Patent [19]

Terry et al.

[11] Patent Number: 5,581,753

[45] Date of Patent: Dec. 3, 1996

[54] METHOD FOR PROVIDING SESSION CONSISTENCY GUARANTEES

[75] Inventors: Douglas B. Terry, San Carlos; Alan J. Demers, Boulder Creek; Karin Petersen, Menlo Park; Michael J. Spreitzer, Tracy; Marvin M. Theimer; Brent B. Welch, both of Mountain View, all of Calif.

[73] Assignee: Xerox Corporation, Stamford, Conn.

[21] Appl. No.: 314,971

[22] Filed: Sep. 28, 1994

[51] Int. Cl.$^6$ ........................................ G06F 13/00
[52] U.S. Cl. ..................... 395/617; 395/690; 395/480; 364/285; 364/DIG. 1; 364/974.1; 364/DIG. 2
[58] Field of Search ................................ 395/600, 325, 395/200, 575, 650, 480, 489

[56] References Cited

PUBLICATIONS

Ravindran et al., "Application Specific Group Communications in Distributed Servers", IEEE; 1991, pp. 1104–1113.
Huhns et al, "Multiagent Truth Maintenance"; IEEE, vol. 21, Issue 6; Nov. 1991, pp. 1437–1445.
Devendra, "Development of Class of Distributed Termination Detection Algorithms"; IEEE, 1992, vol. 4, Issue 2, pp. 145–155.
Neimat et al; "Extensible Transaction Management in Parysus", IEEE 1990, vol. II, pp. 503–511.
Ladin et al., "Lazy Replication: exploiting the semantics of distributed services", IEEE, 1990, pp. 31–34.
Wiederhold et al., "Consistency control of replicated data in Federated databases.", IEEE, Jul. 12, 1990, pp. 130–132.
Richard A. Golding, "Weak consistency group communication for wide –area systems.", IEEE, 1992, pp. 13–16.
P. C. Aristides et al., "Fast read–only transactions in replicated databases.", IEEE, 1992, pp. 246–253.
Downing et al., "OSCAR: An architecture for weak–consistency replication.", IEEE, 1990, pp. 350–358.
Seigel et al., "Deceit: A Flexible distributed file system.", IEEE, 1990, pp. 15–17.

Downing et al., "OSCAR: A system for weak–consistency replication.", IEEE, 1990, pp. 26–30.
Birman, K. P.; Joseph T. A. Exploiting Virtual Synchrony in Distributed Systems. ACM 089791–242–X/87/0011, 1987, pp. 123–138.
Birrell, A. D.; Levin, R.; Needham, R. M.; Schroeder M. D. Grapevine : An Exercise in Distributed Computing. Communications of the ACM. vol. 25, No. 4, Apr. 1982. pp. 10–24.
Davidson, S. B.; Garcia–Molina, H.; Skeen, D. Consistency in Partitioned Networks. Computing Surveys, vol. 17, No. 3, Sep. 1985. pp. 341–370.

(List continued on next page.)

*Primary Examiner*—Thomas G. Black
*Assistant Examiner*—C. Pham

[57] ABSTRACT

The present invention provides client-selected consistency guarantees to clients of a weakly consistent replicated database on a per "session" basis. The clients have access to utilities which allow the clients to, individually or collectively, define a "session" over which the selected guarantees are enforced. A "session" is broadly defined as a sequence of logically related Reads and Writes to the database. Sessions are initiated and terminated substantially independently of other sessions which may exist concurrently. Clients are allowed, however, to clone sessions and/or merge sessions with other clients. Clients select a minimum relevant subset of guarantees from among a set of pre-defined consistency guarantees, where "relevancy" is a client determined factor. At any given time, the system may be enforcing a number of different combinations of consistency guarantees. The guarantees ensure that all clients participating in a particular session view the database as having certain conditions of data consistency—the consistency of which is only provided with respect to the participants' Read and Write requests. Clients are allowed to downgrade their selected guarantees during the course of their sessions. One implementation of the present invention permits the selection of any one of four consistency guarantees.

17 Claims, 15 Drawing Sheets

OTHER PUBLICATIONS

Demers, A.; Greene, D.; Hauser, C.; Irish, W.; Larson, J.; Shenker, S.; Sturgis, H.; Swinehart, D.; Terry, D. Epidemic Algorithms For Replicated Database Maintenance. ©1987 Association for Computing Machinery, Inc. Reprinted by permission from the Proceedings of the ACM SIGACT–SIGOPS 6th Annual Symposium on Principles of Distributed Computing, Aug. 1987. pp. 8–32.

Guy, R. C.; Heidemann, J. S.; Mak, W.; Page, Jr., T. W.; Popek, G. J.; Rothmeier, D. Implementation of the Ficus Replicated File System. Usenix Summer Conference, Jun. 11–15, 1990, Anaheim, California. pp. 63–70.

Kawell, Jr., L.; Beckhardt, S.; Halvorsen, T.; Ozzie, R.; Greif, I. Replicated Document Management in a Group Communication System. Second Conference on Computer–Supported Cooperative Work, Portland, Oregon, Sep. 26–28, 1988. pp. 1–10.

Kistler, J. J.; Satyanaranian, M. Disconnected Operation in the Coda File System. ©1991 ACM 0–89791–447—3/91–0009. pp. 213–225.

Ladin, R.; Liskov, B.; Shrira, L.; Ghemawat, S. Providing High Availability Using Lazy Replication. ACM Transactions on Computer Systems, vol. 10, No. 4, Nov. 1992. pp. 360–391.

Lamport, L. Time, Clocks, and The Ordering of Events in a Distributed System. Communications of the ACM, vol. 21, No. 7, Jul. 1978. pp. 72–79.

Parker, Jr., D. S.; Popek, G. J.; Rudisin, G.; Stoughton, A.; Walker, B. J.; Walton, E.; Chow, J. M.; Edwards, D.; Kiser, S.; Kline, C. Detection of Mutual Inconsistency in Distributed Systems. IEEE Transactions on Software Engineering, vol. SE–9, No. 3, May 1983. pp. 240–246.

Satyanaryanan, M.; Kistler, J.J.; Kumar P.; Okasaki M. E.; Siegel E. H.; Steere, D. C. Coda: A Highly Available File System For a Distributed Workstation Environment. IEEE Transactions on Computers, vol. 39, No. 4, Apr. 1990. pp. 447–459.

Satyanaranyanan, Q. L.; Satyanaranyanan, M. Isolation-Only Transactions For Mobile Computing. pp. 1–6, No Date.

METHOD FOR PROVIDING SESSION CONSISTENCY GUARANTEES

FIELD OF THE INVENTION

The present invention relates in general to a method for providing data consistency guarantees to clients of a distributed database and, in particular, for providing consistency guarantees to clients over the course of a session.

BACKGROUND OF THE INVENTION

In the field of distributed computing, questions of how best to allow multiple users access to a distributed database naturally arise. The answers change depending upon the design goals of the system and the expectations of its users.

In some system that are designed to accommodate the shared access to data among a number of users, some form of data "replication" is typically implemented. To achieve data replication, some systems are partitioned into a number of data "servers"—each server having a complete replica of the system database. These servers process requests from a number of "clients". Typically, client requests come in the form of Reads and Writes to the system database.

Replication of data allows flexibility and availability to clients that are mobile. One characteristic of mobile clients is that they sometimes disconnect from the system—only to reconnect at a later time with different servers than which they were previously connected. If data is completely (and perfectly) replicated across all servers, then a mobile client will always have access to the same system data as long as it can connect to at least one server.

However, the cost of "perfect" replication may be prohibitive—especially in systems that have large numbers of clients and servers. Any change (due to a Write) effected by a client necessarily needs to be immediately propagated to all system servers to ensure perfect replication. If the updates are not "immediately" propagated throughout the system, there exists the possibility that some client will access a data item at a server that has not as yet been updated—thus violating the perfection of the replication.

As a practical matter, perfection, as a system goal, is impossible. Different schemes for the relaxation of this condition have emerged. At one end of the spectrum, "strongly consistent" distributed database provide that changes are either atomically updated throughout the system or provide for some type of server-initiated callbacks when inconsistencies occur. Although strongly consistent systems provide a high degree of data consistency, the price often paid is availability. For example, a client of a strongly consistent database requesting data that has recently been updated may have access blocked to that data until it has been updated across all servers.

At the other end, "weakly" consistent databases would allow access to servers and data that may not contain all system updates. Such systems typically are characterized by the "lazy" propagation of updates between servers (i.e. updated servers propagate updates to other servers over time); thus the possibility exists for clients to see inconsistent values when reading data from different replicas. Despite this disadvantage, weakly consistent systems are popular due to their high-availability, good scalability, and simplicity of design. These advantages arise from the ability to allow reads and writes to be performed with little or no synchronization among replicas.

More recently, the use of weakly consistent replicated data has been driven by the needs of mobile computing applications. For example, disconnected users may want to read and update data copied onto their portable computers even if they did not have the foresight to commit it before either a voluntary or an involuntary disconnection occurred. Also, the presence of slow or expensive communications links in the system can make maintaining closely synchronized copies of data difficult or uneconomical.

Unfortunately, the lack of guarantees concerning the ordering of read and write operations in weakly consistent systems can confuse users and applications. A user may read some value for a data item and then later read an older value. Similarly, a user may update some data item based on reading some other data, while others read the updated item without seeing the data on which it is based. A serious problem with weakly consistent systems is that inconsistencies can appear even when only a single user or application is making data modifications. For example, a mobile client of a distributed database system could issue a write at one server, and later issue a read at a different server. The client would see inconsistent results unless the two servers had synchronized with one another sometime between the two operations.

Because data availability and data consistency are sometimes mutually exclusive goals, systems have attempted to strike some form of accommodation between the two as a system design choice. However, because a system generally supports a disparate number of clients, each with their own independent needs for security and availability, one system-wide, imposed solution to this trade-off is not desirable from a client's perspective. Some clients may want more data consistency to the detriment of availability while others prefer to access some copy of data—even though that may mean occasionally getting an inconsistent (or not "up-to-date") version.

Thus, there is a need to provide a mechanism to allow clients of a replicated database to choose the balance of data consistency and data availability for themselves. Additionally, one client's choice should be independent from the choices of other clients.

Therefore, it is an object of the present invention to provide individual clients a mechanism by which each respective client can select the level of data consistency according to its own needs and purposes.

It is an additional object of certain aspects of the present invention to have this selection of a client's consistency to be as independent as possible from the selection of other clients.

SUMMARY OF THE INVENTION

The present invention provides client-selected consistency guarantees to clients of a weakly consistent replicated database on a per "session" basis. The clients have access to utilities which allow the clients to, individually or collectively, define a "session" over which the selected guarantees are enforced. A "session" is broadly defined as a sequence of logically related Reads and Writes to the database. Sessions are initiated and terminated substantially independently of other sessions which may exist concurrently. Clients are allowed, however, to clone sessions and/or merge sessions with other clients.

Clients select a minimum relevant subset of guarantees from among a set of pre-defined consistency guarantees, where "relevancy" is a client determined factor. At any given time, the system may be enforcing a number of different combinations of consistency guarantees. The guarantees ensure that all clients participating in a particular session view the database as having certain conditions of data consistency—the consistency of which is only provided with respect to the participants' Read and Write requests. Clients are allowed to downgrade their selected guarantees during the course of their sessions.

One implementation of the present invention permits the selection of any one of four consistency guarantees. The guarantees are summarized as follows:

1) Read Your Writes—read operations reflect previous writes that are part of the same session.
2) Monotonic Reads—successive reads reflect a non-decreasing set of writes.
3) Writes Follow Reads—writes are propagated after reads on which they depend.
4) Monotonic Writes—writes are propagated after writes that logically precede them.

These properties are "guaranteed" in the sense that either the system ensures them for each read and write operation belonging to a session, or else it informs the calling application that the guarantee cannot be met.

One advantage of the present invention is freedom of choice. By allowing participants in each session the option of defining both the duration and the subset of consistency guarantees for such session, the trade-off between data consistency and server availability is decided by the individual client—and is not a design choice of the database imposed upon all users. As a general rule, the shorter the duration of a session, the more available servers may exist that can satisfy the selected consistency guarantees. Likewise, the smaller the number of consistency guarantees selected by the session participant, the more servers may exist to satisfy that subset of guarantees.

Another advantage of the present invention is independence. Each session exists substantially independently from each other. At any given time, any number of sessions may exist and be terminated without regard to any other sessions. However, sessions may sometimes be cloned from or merged into another session.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

I. BASIC SYSTEM MODEL 1.0 Definitions and Terminology

As previously mentioned, the goal of the present invention is to provide certain data consistency "guarantees" to participants in sessions conducted on a distributed database. These guarantees give all participants in a given session a view of the database that is consistent with the prior actions (e.g. Reads and Writes) of the participants, even if one or more of the participants access different, potentially inconsistent data over time. Although the goal of the present invention is broad enough to encompass all manners of distributed database architectures, the present embodiment is drawn to a typical "client/server" model of a distributed database.

Figure 1:
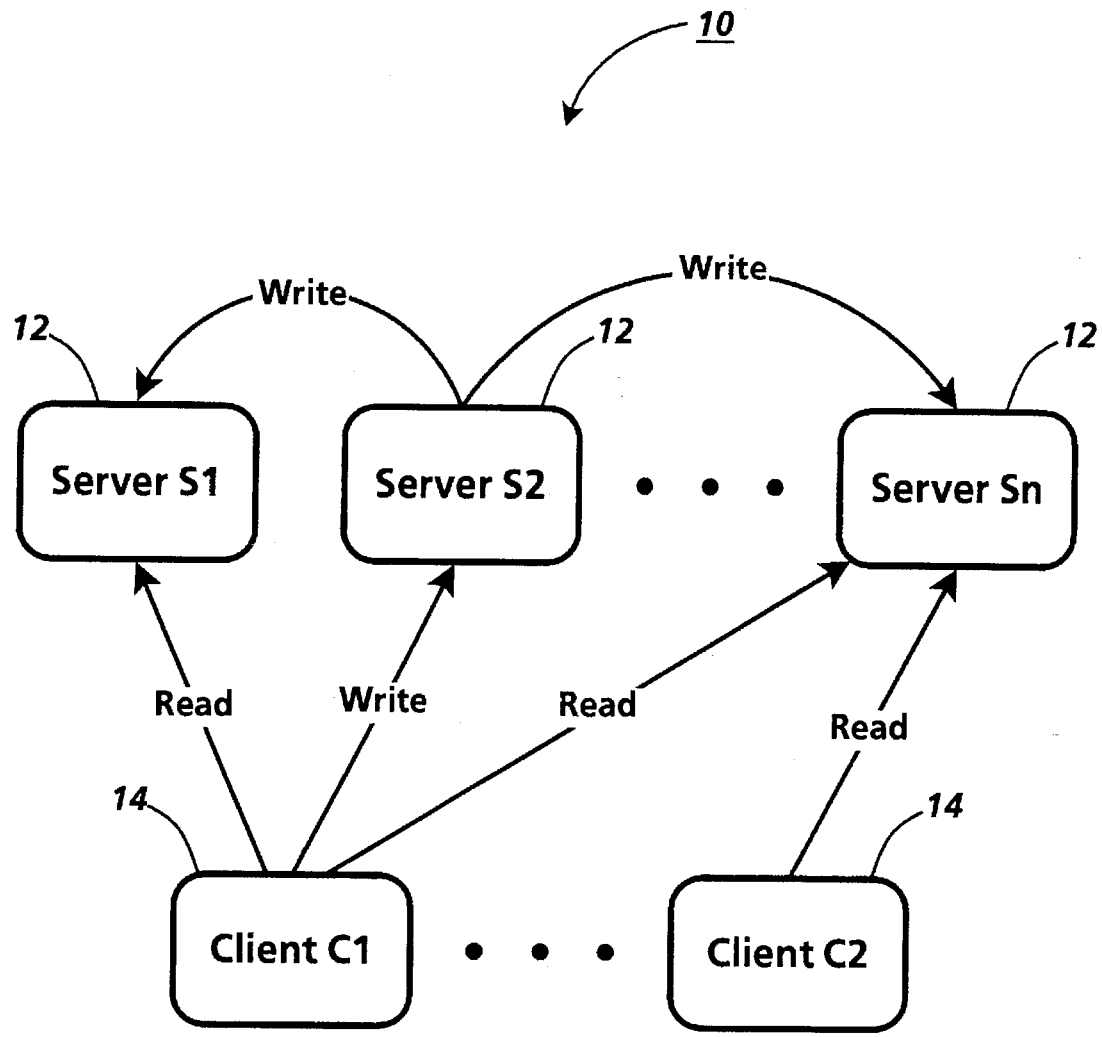
FIG. 1 is a diagram of the basic client/server model in which the present invention is implemented.

Referring now to FIG. 1, the basic "client/server" model 10, which serves as an environment of the present invention, is shown. Servers 12 primarily are repositories of data (i.e. databases) that may be created by various clients 14 or copied from other servers. It will be appreciated that the term "database" is not meant to imply any particular data model or organization, nor are the techniques presented specific to any data model. A database is simply a set of data items, where a data item could be anything from a conventional file to a tuple in a relational database.

Servers 12 are shown in communication with other servers 12 and/or one or more clients 14. These communication lines may either by continuous or intermittent. The most common communication between clients and servers occurs in the form of "Read" and "Write" requests to data that is stored at the various servers 12. Read and Write operations may be performed at any server or set of servers. Additionally, both Read and Write requests may be made specific to a particular data item stored in the database, or it may be in the form of a database query (in which several data items are retrieved that match the conditions of the query).

For example, a Read could be a simple retrieval operation such as "return the contents of a particular file" or a complicated query such as "return the names of all employees who make more than $100,000." The Write operation updates the database. A Write may involve creating, modifying, or deleting data items. It may also represent a transaction that atomically updates multiple items in a server's database.

As a server's database changes according to certain transactions, it is useful to conceive of a server's database as having a time-dependent component. For the purposes of the present invention, "DB(S,t)" is defined to be the ordered sequence of Writes that have been received by server S at or before time t. If t is known to be the current time, then it may be written as DB(S) to represent the current contents of the server's database. Conceptually, server S creates its own copy of the database by starting with an empty database and applying each Write in DB(S) in the given order. In practice, a server is allowed to process the Writes in a different order as long as the ordering of the resulting database entries is unchanged. Thus, for example, the order of Writes in DB(S) does not necessarily correspond to the order in which server S first received the Writes.

Model 10 assumes that the data stored at the servers is "replicated" (i.e. that data stored at one server is reproduced at the various servers over time). Because the updates propagate gradually over time (and not atomically or instantaneously), the database in model 10 is "weakly consistent". Weak consistency permits database copies at different servers to vary. That is, DB(S1,t) is not necessarily equivalent to DB(S2,t) for two servers S1 and S2.

Model 10 additionally assumes "eventual consistency" in which servers converge towards identical database copies in the absence of updates. In other words, for each Write W there exists a time t such that W is in DB(S,t) for each server S. Eventual consistency relies on two properties: "total propagation" (i.e. where all updated data is eventually received at each server) and "consistent ordering" (i.e. where the Writes that have an "order dependency" get ordered the same way at all servers).

To achieve eventual consistency, model 10 makes two assumptions about the replication of data across the various servers. First, model 10 assumes that replication is accomplished by "lazy propagation". Lazy propagation ensures that each Write is propagated to other servers over time. It will be appreciated that many algorithms implementing lazy propagation exist and are well known in the art. Thus, the scope of the present invention should not be limited to the choice of any particular algorithm.

Second, model 10 assumes that all servers must apply all "non-commutative" Writes (i.e. Writes whose "order" of application to a database results in two different databases) to their databases in the same order. To help achieve this, "WriteOrder(W1,W2)" is defined as a boolean predicate indicating whether Write W1 should be ordered before Write W2. Thus, if WriteOrder(W1,W2) is True, then W1 should be ordered before W2 in DB(S) for any server S that has received both W1 and W2.

In an eventually consistent system (such as model 10), servers could use any of a variety of techniques to agree upon the order of Writes (and hence, test the satisfaction of the boolean WriteOrder (W1,W2)). In one such technique, Writes could be ordered by an "origination timestamp" given by a server according to the order of Write requests presented. The use of timestamps to determine Write order, however, does not imply that servers have synchronized clocks because there is no requirement that Writes be ordered by the actual time at which they were performed. It will also be appreciated that techniques, other than timestamping, for ordering Writes are well known to those skilled in the art.

Lastly, weakly consistent systems allow conflicting Writes to occur. That is, two clients may make concurrent and incompatible updates to the same data item. Existing systems resolve conflicting Writes in different ways. In some systems, the WriteOrder may determine which Write is ordered first, while other systems rely on humans to resolve detected conflicts. It will be appreciated that the present invention is not concerned with the resolution of conflicting Writes generated by two or more clients. Instead, as mentioned above, the present invention provides certain consistency "guarantees" to clients to support a view of the database that is consistent for each session with respect to with the actions (e.g. Reads and Writes) of all the participants in any given session, even if some or all of these participants access different, potentially inconsistent servers over time.

1.1 Client and Server Architectures

Different client/servers database implementations are generally known to those in the art. However, to provide the additional functionality that is promised by the present invention, it is necessary to add some additional features to the common client/server architecture.

Figure 2:
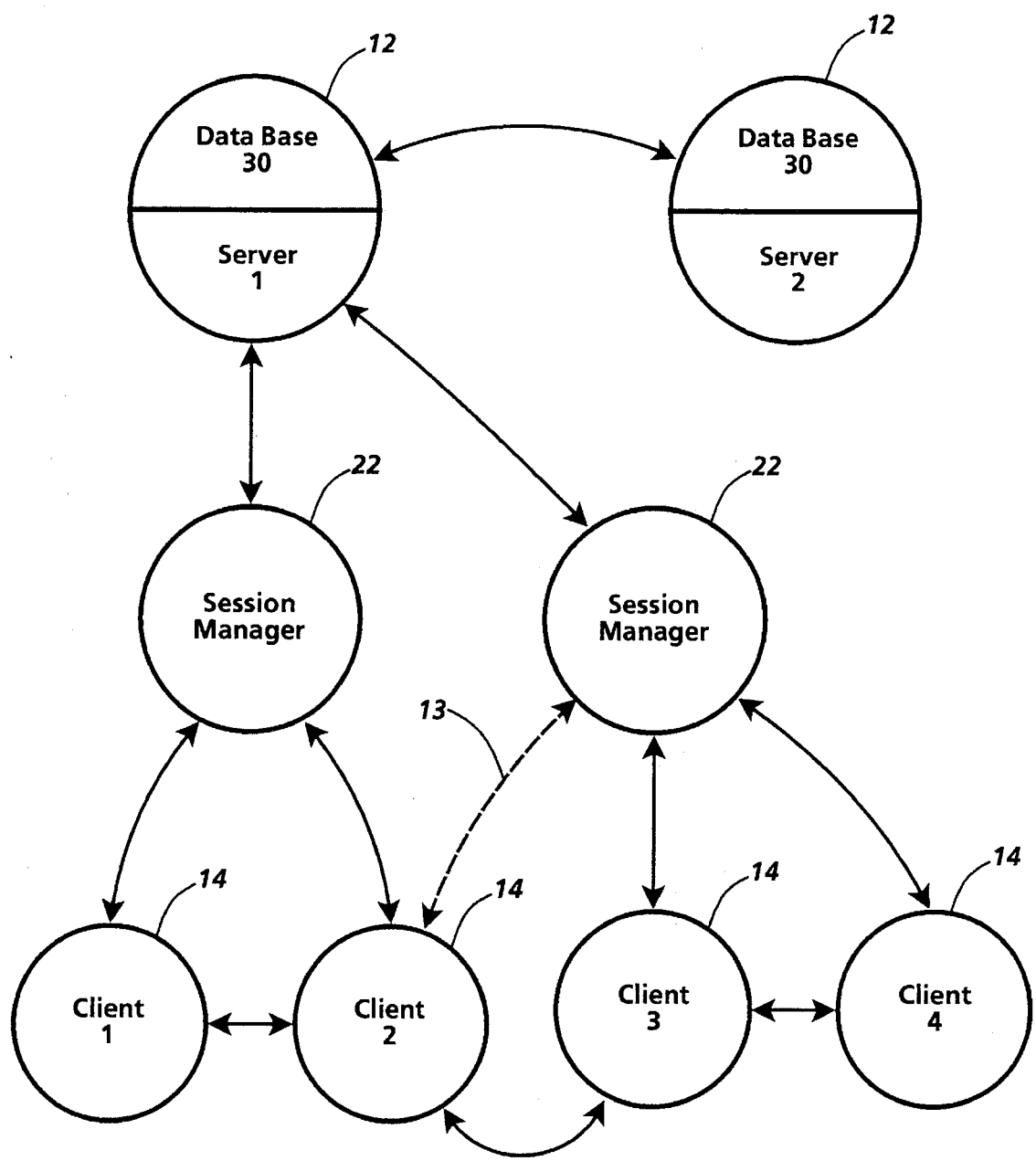
FIG. 2 is an exemplary configuration of clients, servers and session managers.

Referring now to FIG. 2, an exemplary configuration of clients, servers and session managers is shown. The arrowed lines represents illustrative communications paths among these entities. The manner in which any two entities communicate with each other depends on the where they are located. In particular, entities may reside on the same or different hosts; thus, different means of communication will be most appropriate. For example, if two entities reside on the host in the same address space, then simple procedure call may be the most appropriate means of communications; whereas if two entities reside on different hosts, then Remote Procedure Call (RPC) may be most appropriate. The present invention encompasses all variations of entity location and communications choices. It will also be appreciated that communications may be accomplished via either a wired or a wireless media.

Clients 14 communicate with session managers 22 as part of session operations. More than one client may belong to the same session and each client may participate in more than one session. Any given session is handled by a single session manager, however, any session manager may handle more than one session. Session managers 22 communicate with servers 12 on behalf of clients 14. Servers communicate among themselves to propagate updates.

Each session is associated with a session identifier. The session identifier is used by session managers to distinguish different sessions. Multiple clients can participate in a single session by using the same session identifier. Thus, clients must be able to exchange the session identifier for the session they wish to share. One way to exchange session identifiers is by direct client-to-client communication. This communication may be facilitated indirectly by one client posting the session identifier in a location accessible to the other client.

The session manager 22, as will be discussed in greater detail below, handles the initiation of a session, the per session selection of a set of data guarantees, and the per session enforcement of those guarantees. Database services from servers 12 are typically requested by clients 14. A client makes requests as part of a session. To enforce the consistency guarantees of the present invention for a session, a client makes its requests to the session manager 22 responsible for the session. The session manager communicates with the appropriate servers to implement the database request of the client.

Because clients and session managers implement sessions and their guarantees, servers are generally unaware of any active sessions. Server 12 processes a Read request by retrieving the data satisfying the request from its database 30 and passing it back to the requester. A Write request is processed generally by changing the contents of its database. It will be appreciated that many databases and their managers are well known to those in the art.

To implement the current embodiment, each server needs to store its particular state. Broadly, the "state" of the server is the set of all Writes it "knows" about. The granularity of this Write information may vary according to data size. For example, servers might maintain large tables that list all Writes made to the server itself, volumes within the server, files within the volumes, or individual bytes within files. Clearly, the more fine-grained the Write information, the greater the overhead in implementing the guarantees.

The purpose of this Write information, as will be seen below, is to determine whether the data is sufficiently "up-to-date" to facilitate the enforcement of consistency guarantees. If no reachable server's data is sufficiently "up-to-date" then the session manager will inform the client.

II IMPLEMENTATION

Now that the basic system model and structure have been described, an implementation of the present invention will now be given.

2.0 Session Definition and Primitives

As mentioned previously, the present invention provides participants in each session with a view of the database that is consistent with the actions of the participants during the course of each session. In a broad sense, a "session" is a series of Read and Writes requests generated by one or more clients. Because the notion of session is broad, clients are given a great deal of latitude in starting and controlling its duration. Other session primitives are provided to the client for additional functionality (other than "start session" and "end session"). These session primitives are detailed in Table 1 below:

TABLE 1

SESSION PRIMITIVES

```
START_SESSION (Guarantee_Set)
        /* Client application calls Start_Session and passes to the Session
           Manager a set of guarantees to be maintained over the course of
           the session. /*
   SID      := Allocate_State ( );
        /* Session Manager creates the data structures Read_Set ("RS") and
           Write_Set ("WS") to be maintained as the "Session State". /*
   SID.GS   := Guarantee_Set;
   SID.RS   := { };    /*Initialize Read Set to Null. /*
   SID.WS   := { };
   Return SID;    /*Return the "Session ID" (SID) to the calling
                   application. /*
END_START_SESSION
END_SESSION (SID);
        /* Application terminates session specifically by Session ID. /*
   Deallocate (SID);   /* Terminate by reclaiming Session State. /*
END_END_SESSION
DOWNGRADE_GUARANTEES (SID, Deleted_Guarantees);
        /* Allows user to downgrade the set of guarantees during the course
           of a session. /*
   SID.GS := SID.GS-Deleted_Guarantees;
END_DOWNGRADE_GUARANTEES
CLONE_SESSION (SID₁);
        /* Allows clients to "clone" session - (i.e. to allow other clients to
           "pick-up" a duplicate of a session). /*
   SID₂ := Allocate_State ( );
   SID₂.GS := SID₁.GS;
   SID₂.RS := SID₁.RS;
   SID₂.WS := SID₁.WS;
   Return SID₂;
END_CLONE_SESSION
MERGE_SESSION (SID₁, SID₂, Guarantee_Set);
        /* Allows multiple clients that may be file sharing to guarantee
           that both clients have latest versions of file. /*
   SID₃ := Allocate_State ( );
   SID₃.GS := Guarantee_Set;
   SID₃.RS := SID₁.RS ∪ SID₂.RS;     /* Take the union of the two
                                        Read Sets/*
   SID₃.WS := SID₁.WS ∪ SID₂.WS;
   Return SID₃;
END_MERGE_SESSION
```

The current implementation gives individual clients a certain amount of control over the sessions in which they participate. Sessions may be initiated, terminated, altered or duplicated. To initiate a session, the client simply invokes the Start_Session procedure at the session manager.

Table 1 outlines one embodiment of the session manager. Session primitives allow a user to Start, End, Downgrade, Clone or Merge sessions. To "start" a session, a client invokes a Start_Session call to the session manager. The session manager, in response, allocates a "session state" that is uniquely identified by a "Session ID" ("SID"). The session state contains state variables, such as "Read_Set" and "Write_Set" and "Guarantee_Set".

The "Guarantee_Set" is a parameter that is passed by the client to the session manager. As will be discussed in greater detail below, this parameter is a list of pre-defined guarantees that have been selected to be enforced over the course of the session. The "Read_Set" for a given session is a set of Writes that are "relevant" to the Reads occurring in the session. The RelevantWrite set for a particular Read operation is defined to be the set of Writes that must be known by a server to ensure that the selected guarantee set is met by the results of the Read performed at that server. The Read_Set is the union of the RelevantWrite sets of every Read that has occurred in the session. Writes included in the Read_Set may originate from a client's Write or from any other server. The "Write_Set" is the set of all Writes performed by the client or client participants in the given session. As will be seen below, Read_Sets and Write_Sets are used in the enforcement of session guarantees.

To "end" a session, the client invokes End_Session at the session manager and, passes the SID that uniquely identifies the session to be terminated. The session manager, in ending a session, merely deallocates memory previously allocated to the terminated session state and removes any reference to the SID. From these two basic primitives, Start_Session and End_Session, it is possible provide a simple example of a session as currently embodied.

Figure 3:
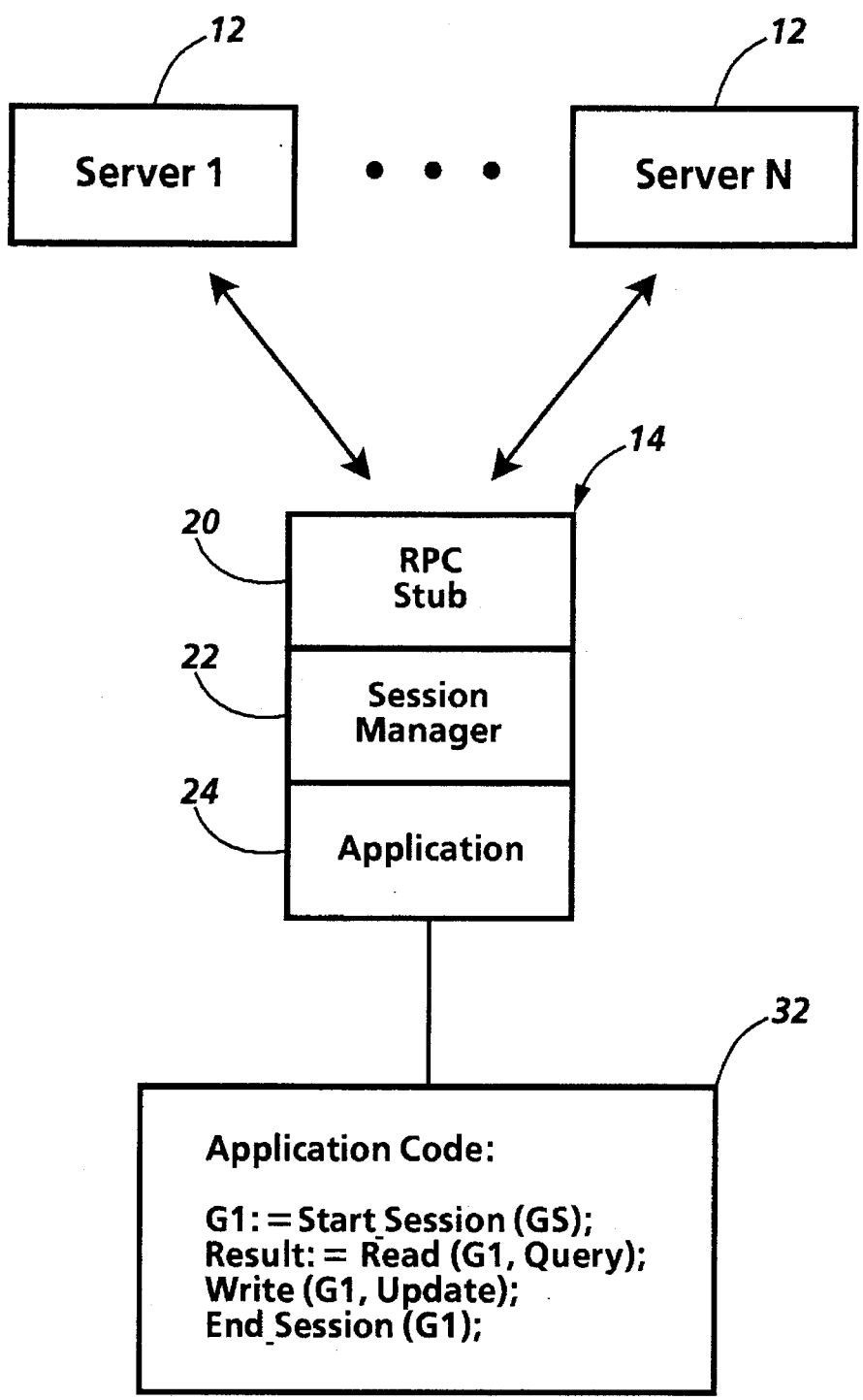
FIG. 3 depicts a simple, exemplary session invoked by a client application.
Figure 14:
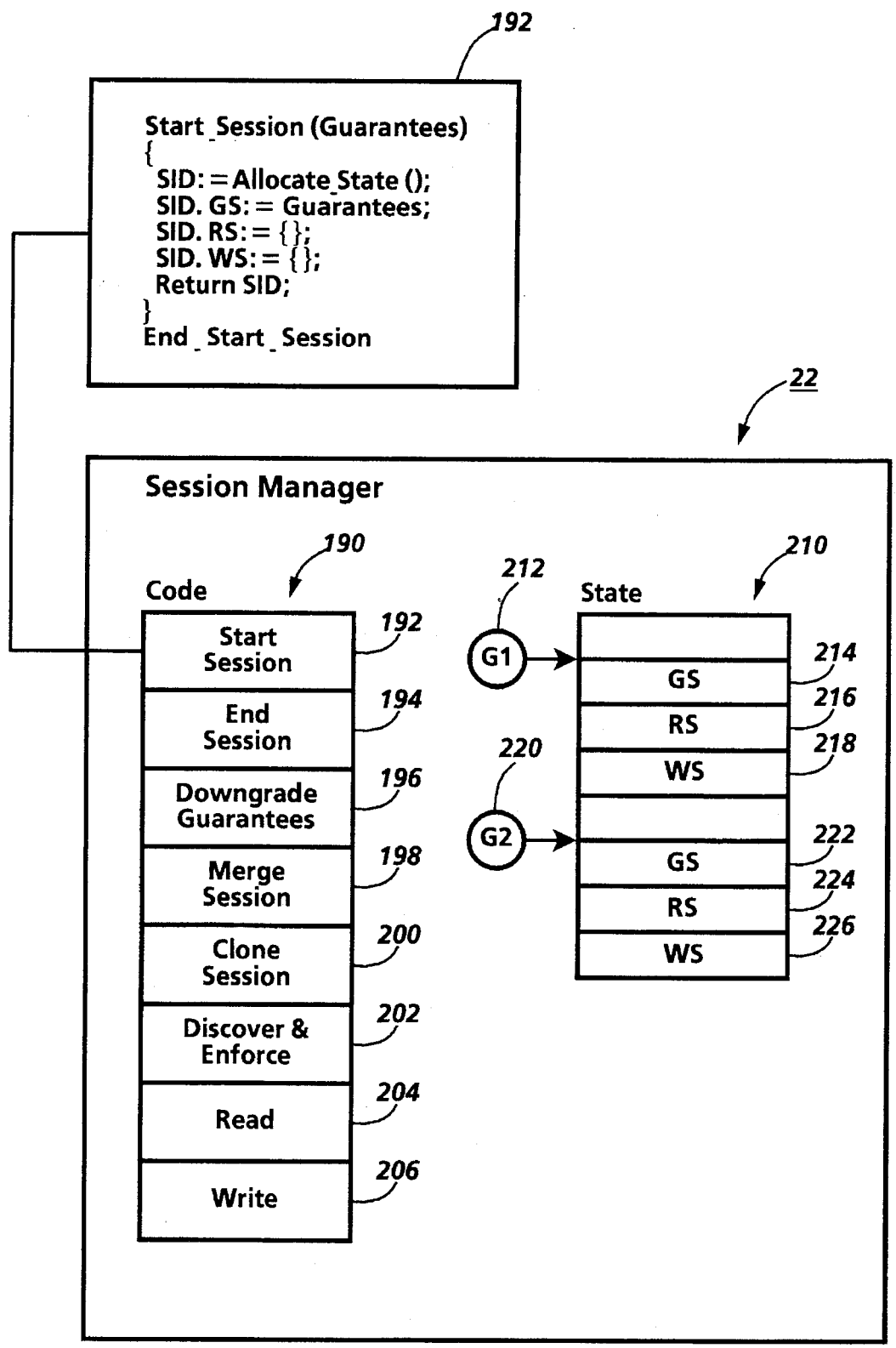
FIG. 14 is a block diagram of the session manager.

Reference with now be made to FIGS. 3 and 14. FIG. 14 is a block diagram of the session manager as currently embodied. Session manager 22 comprises several code routines 190 (for example, Start_Session code 192 is supplied as found in Table 1.) and storage for session states 210. FIG. 3 depicts an exemplary session by application 24 whose code 32 is shown. A session is invoked by making a call ("G1:=Start_Session (guarantees)") to the session manager 22. The session manager can be either part of the application 24 by being linked in as a library or a separate process, apart from applications, that is located through a name service and accessed through a RPC infrastructure.

Application 24 passes a list of the pre-defined guarantees it would like enforced over the session. In return, the session manager 22 passes back the SessionID ("G1") to identify the session. "G1" may be implemented as a pointer 212 to the session state 210 that contains the following fields: GS 214 (i.e. guarantee set), RS 216 (i.e. Read_Set), and WS 218 (i.e. Write_Set). Alternatively, G1 could be an identifier that can be mapped by the session manager to the location of the session state. These fields may be implemented as dynamically linked lists—thus allowing them to grow during the course of the session. It will be noted that the session manager storage may contain more than one active session at a time (e.g. session G2 220).

If the multiple clients want to use the session, they must have access to the SessionID. Session identifiers must therefore be meaningful in the contexts of multiple clients. For example, if the multiple clients and session manager for a shared session reside in the same address space, then a meaningful session identifier could be a pointer to a data structure representing the session state.

If, however, they reside in different address spaces (perhaps even on different hosts) then a meaningful session identifier could be a tuple of integers: one integers identifying the particular session manager in charge of the session and another integer identifying the particular session within that session manager. This tuple would then support the communication between the accessing client and the session manager, as denoted by dashed line 13 in FIG. 2. An appropriate mapping from the second integer to the session it represents could be done by means of a table that explicitly records the mapping. It will be appreciated, however, that other mapping means exist and are well known in the art.

Every subsequent Read and Write that is part of the session contains the SessionID, G1. Read and Write commands, issued by application 24, may be implemented as a call to a Read and Write procedure respectively, located in the session manager 190. In the Read case, the Session Manager actively strips off the SessionID G1, discovers which servers are sufficiently up-to-date, issues the query to at least one suitable server, passes the Result back to the application, and updates RS in the session state as needed. In the Write case, session manager 190 strips off the SessionID G1, discovers which server is suitable, issues the update to at least one suitable server, and updates WS in the session state as needed.

When application 24 desires that the session terminate, application 24 issues an End_Session call. Session Manager calls a Deallocate routine that both recovers the storage used by session G1 and removes any reference to the SessionID for that particular session.

2.1 Server Cooperation

With this set of session primitives, clients are able to inform session managers what is desired in terms of session initiation, termination, and which guarantees are to be provided. Once the client's desires are made known to the session manager for a given session, the session manager enforces those selected guarantees over the course of the session. To facilitate that enforcement, the session manager needs some additional information concerning the data at the servers. This implies some server cooperation with the session manager.

For the purposes of the present embodiment, three basic assumptions are made in regards to server cooperation:

(1) For each Write issued to a server, servers return a WriteID (WID) that is assigned specifically to that Write and is unique across the system.

(2) For each Read issued to a server, in addition to the query results, servers return a set of WIDs that are "relevant" to that Read.

(3) Clients can obtain the server's state (i.e. the set of all Writes "known" to the server).

When WIDs are returned from the server to the session manager in response to a client Read, the WIDs relevant to the Read are appended to the Read_Set. Likewise, WIDs returned in response to a client's Write are appended to the Write_Set. As will be seen below, these sets retain the information necessary to enforce the session guarantees.

2.2 Consistency Guarantees

The present invention gives clients the freedom to decide the amount of data consistency required for their particular purposes. This goal makes the trade-off issue of consistency versus availability a point of decision for individual clients—not an imposed system-wide design choice. A "good" strategy for a client is to select a minimal number of such guarantees to meet client purposes. A minimal set of guarantees maximizes the chances that any particular Read/Write request that is issued during a given session will be satisfied by some suitable server.

The present embodiment defines four consistency guarantees that may be separately selected for different sessions. Once a session has started (and the subset of guarantees initially selected), the client may downgrade the set of guarantees desired by invoking a Downgrade_Guarantees call to the session manager. This would preserve the notion of an "integrated" session (i.e. where all presently enforced guarantees are enforced from Read/Write information obtained from the start of the session). It is possible that some added guarantees can only be meaningfully enforced from the time they were added—not from the start of the session.

Although only four consistency guarantees are presently defined, it will be appreciated that other guarantees and conditions may be similarly defined and enforced over the duration of a session. The proper scope of the present invention encompasses any number of pre-defined guarantees and conditions that may be defined, selected, and enforced over the duration of a session.

2.2.1 "Read Your Writes" Guarantee (RYW)

The first guarantee, Read Your Writes is motivated by the fact that users and applications find it particularly confusing if they update a database and then immediately read from the database only to discover that the update appears to be missing because they have read from another server that has not been updated. This guarantee ensures that the effects of any Writes made within a session are visible to Reads within that session. In other words, Reads are restricted to copies of the database that include all previous Writes of this session. Specifically:

RYW-guarantee: If Read R follows Write W in a session and R is performed at server S at time t, then W is included in DB(S,t).

It should be noted that applications are not guaranteed that a Read following a Write to the same data item will return the previously written value. In particular, Reads within the session may see other Writes that are performed outside the session (perhaps by other clients).

It is now helpful to consider a couple of examples to illustrate how the RYW-guarantee might be used in practice.

EXAMPLE 1

After changing his password, a user of a weakly consistent database may occasionally type the new password and receive an "invalid password" response. This annoying problem arises because the login process contacted a server to which the new password had not yet propagated. It can be solved cleanly by having a session per user in which the RYW-guarantee is provided. Such a session should be created for each new user and must exist for the lifetime of the user's account. By performing updates to the user's password as well as checks of this password within the session, users can use a new password without regard for the extent of its propagation. The RYW-guarantee ensures that the login process will always read the most recent password. It should be noted that this application requires a session to persist across logouts and machine reboots. To facilitate this, a user's session state may be saved onto a "smart card" (or some semi-permanent, portable storage) and carried with the user to other hosts.

EXAMPLE 2

Consider a user whose electronic mail is managed in a weakly consistent replicated database. As the user reads and deletes messages, those messages are removed from the displayed "new mail" folder. If the user stops reading mail and returns sometime later, the user should not see deleted messages reappear simply because the mail reader refreshed its display from a different copy of the database. The RYW-guarantee can be requested within a session used by the mail reader to ensure that the effects of any actions taken, such as deleting a message or moving a message to another folder, remain visible.

Figure 4:
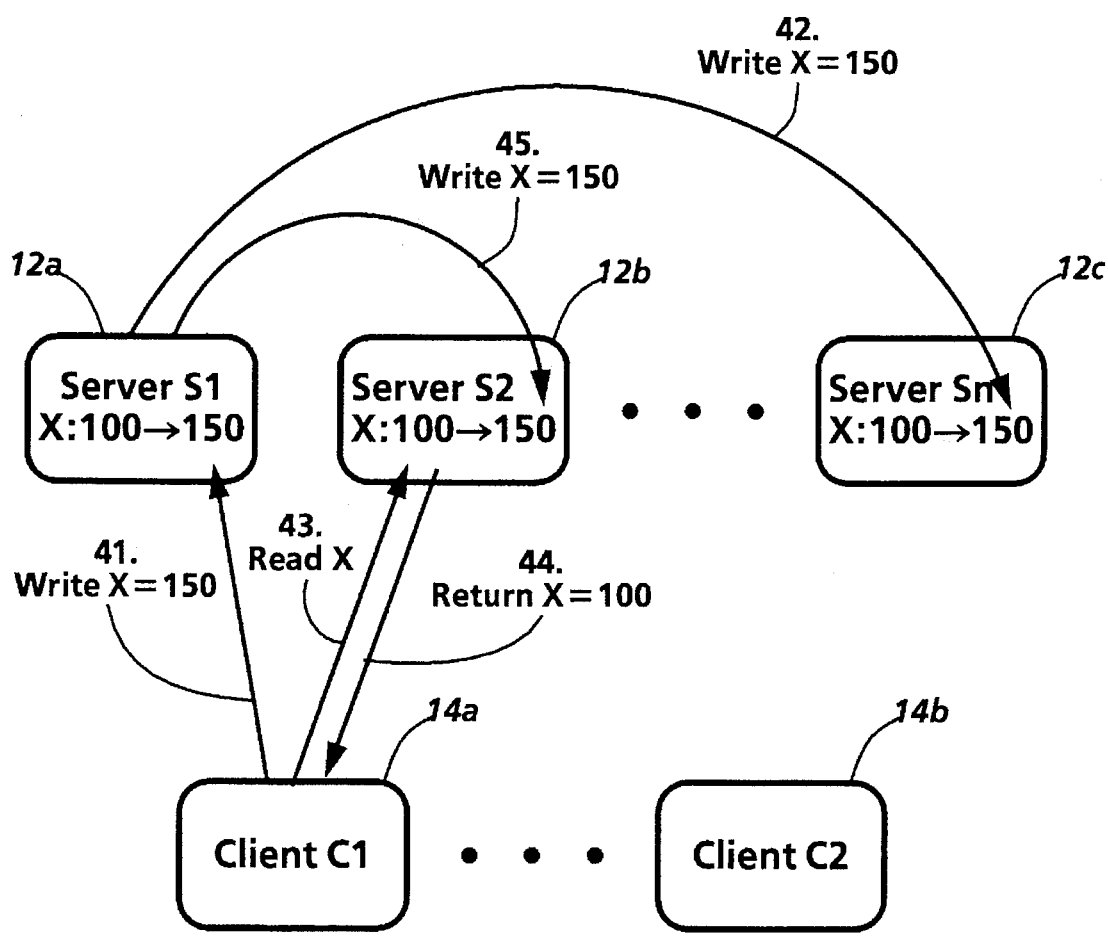
FIGS. 4 and 5 illustrate the absence and presence, respectively, of the Read Your Writes guarantee in an exemplary client transaction.
Figure 5:
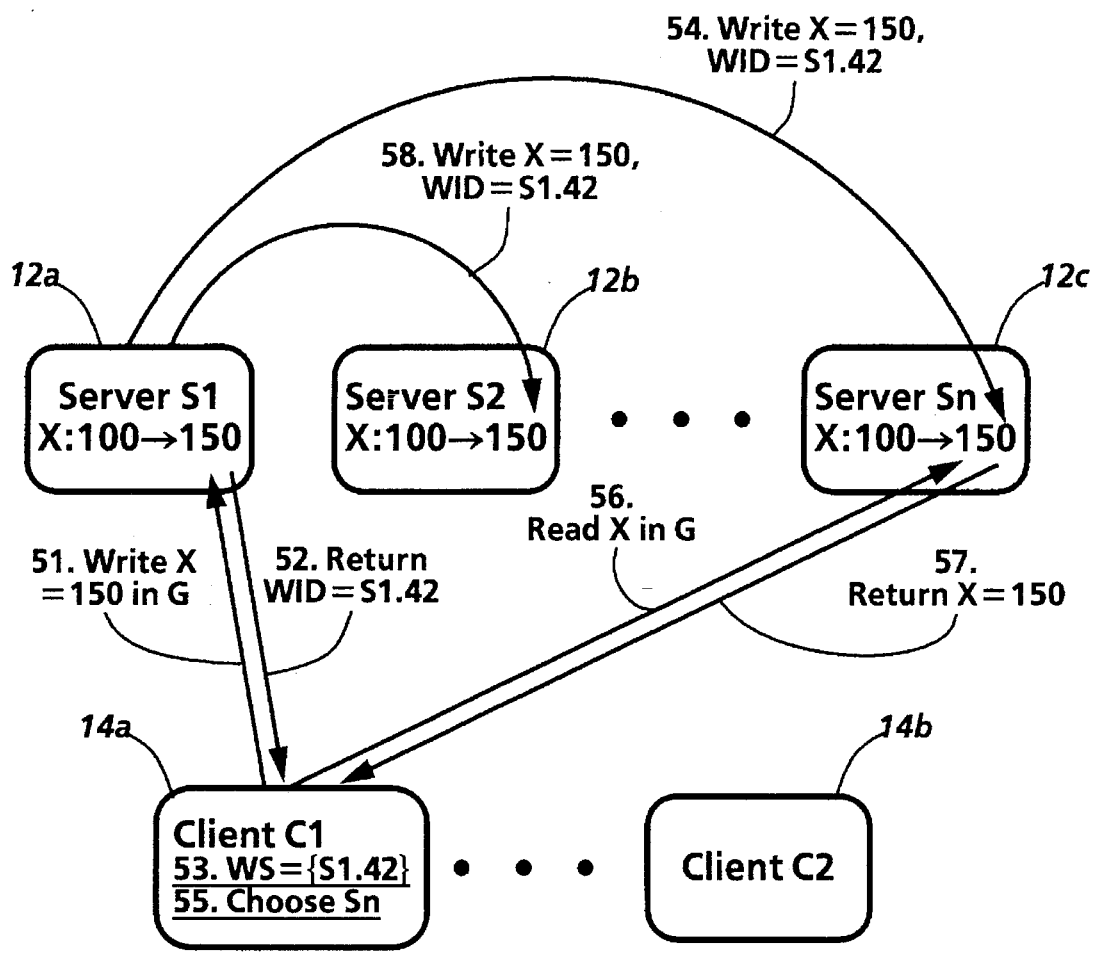

To graphically depict the RYW guarantee, FIGS. 4 and 5 show a exemplary client transaction that illustrates the importance and effect of the RYW guarantee. FIG. 4 depicts a scenario where, without RYW enforcement, some undesirable results may happen:

Step 41: Client 14a ("C1") updates his savings account to reflect a new balance of $150 from $100 at ATM server 12a (S1).

Step 42: S1 "lazily" propagates the change to server 12c (Sn).

Step 43 and 44: C1 subsequently "reads" his account balance at ATM server 12b (S2) and receives the "old" account balance of $100.

Step 45: At some future time, S1 lazily propagates the update to S2.

FIG. 5 shows the same scenario depicted in FIG. 4; but with the RYW guarantee selected and enforced. FIG. 5 assumes that client C1 executes the following program:

G=Start_Session (RYW);
Write (G, X, 150);
Value=Read (G, X);
End_Session (G);

Step 51: C1 "starts" a session G and Writes a new balance to S1 of $150.

Step 52: S1 assigns and returns a WID for the Write back to C1.

Step 53: C1 appends the new WID to its Write_Set.

Step 54: S1 lazily updates to Sn the current data and the WID associated with the original update request.

Step 55: C1 "discovers" that it must Read in session G from either S1 or Sn.

Step 56: C1 Reads from Sn in session G.

Step 57. S2 returns the new balance of $150.

Step 58: S1 updates S2 at a later time.

The "discovery" step taken at step 55 is a process carried out by C1's session manager. The goal is to find a set of suitable servers whose data may satisfy the client's request with respect to the enforced guarantee. Broadly, the process of discovery is accomplished by: locating all servers "reachable" by the given client, querying all such servers for their Write information (i.e. a server's WriteSet or DB(S)) and comparing these server's WriteSets to the client's Write_Set and/or Read_Set to test if these servers' Write_Sets includes the client's Write_Set and/or Read_Set, depending upon the client's current request. If no server's Write_Set meets this test, then the data cannot be "guaranteed". In such an instance, the client may elect to end the session and retrieve the data anyway without regard to guarantees.

It will be appreciated that the step of locating all reachable servers may be accomplished in any number of known ways. For example, the client may query a name server that maintains a list of all accessible servers. Alternatively, the client could broadcast (or multicast) a query to all servers. This locating step is particularly important for mobile clients whose mobility places them occasionally into communication with different sets of servers.

What is "reachable" may also depend on a number of factors not related to technical feasibility. For example, a cost ceiling may be placed on what is reachable. For example, a mobile client in Boston may, technically, be able to connect with a server in London; but the cost would be too prohibitive. Accordingly, the scope of the present invention should not be limited to the selection of any particular location mechanisms.

In summary, providing the Read Your Writes guarantee involves two basic steps. Whenever a Write is accepted by a server, its assigned WID is added to the session's write-set. Before each Read to server S at time t, the session manager must check that the write-set is a subset of DB(S,t). Without loss of generality, this check could be done either on the server by passing the client's write-set to the server or on the client by retrieving the server's list of WIDs. The session manager can continue trying available servers until it discovers one for which the check succeeds. If it cannot find a suitable server, then it reports to the client that the guarantee cannot be provided.

2.2.2 "Monotonic Reads" Guarantee (MR)

The Monotonic Reads guarantee permits users to observe a database that is increasingly up-to-date over time. It ensures that Read operations are made only to database copies containing all Writes whose effects were seen by previous Reads within the session.

Before stating the MR-guarantee, two definitions ("complete" and "RelevantWrites") are required. Intuitively, a set of Writes "completely" determines the result of a Read if the set includes "enough" of the database's Writes so that the result of executing the Read against the set of Writes is the same as executing it against the whole database. Specifically, we say a WriteSet WS is "complete" for Read R and DB(S,t) if and only if WS is a subset of DB(S,t) and for any set WS2 that contains WS and is also a subset of DB(S,t), the result of R applied to WS2 is the same as the result of R applied to DB(S,t).

Let "RelevantWrites(S,t,R)" denote the function that returns the smallest set of Writes that is complete for Read R and DB(S,t). It will be noted that some complete set exists since DB(S,t) is itself complete for any Read. If the smallest complete set is not unique, the tie may be broken in an arbitrary, but deterministic manner. Intuitively, RelevantWrites(S,t,R) is a smallest set that is "enough" to completely determine the result of R. Given these definitions, the Monotonic Reads guarantee can now be defined precisely as follows:

MR-guarantee: If Read R1 occurs before R2 in a session and R1 accesses server S1 at time t1 and R2 accesses server S2 at time t2, then RelevantWrites(S1,t1,R1) is a subset of DB(S2,t2).

A few example will help illustrate this guarantee:

EXAMPLE 3

A user's appointment calendar is stored on-line in a replicated database where it can be updated by both the user and automatic meeting schedulers. The user's calendar program periodically refreshes its display by reading all of today's calendar appointments from the database. If it accesses servers with inconsistent copies of the database, recently added (or deleted) meetings may appear to come and go. The MR-guarantee can effectively prevent this since it disallows access to copies of the database that are less current than the previously read copy.

EXAMPLE 4

Consider the replicated electronic mail database of Example 2 above. The mail reader issues a query to retrieve all new mail messages and displays summaries of these to the user. When the user issues a request to display one of these messages, the mail reader issues another Read to retrieve the message's contents. The MR-guarantee can be used by the mail reader to ensure that the second Read is issued to a server that holds a copy of the message. Otherwise, the user, upon trying to display the message, might incorrectly be informed that the message does not exist.

Figure 6:
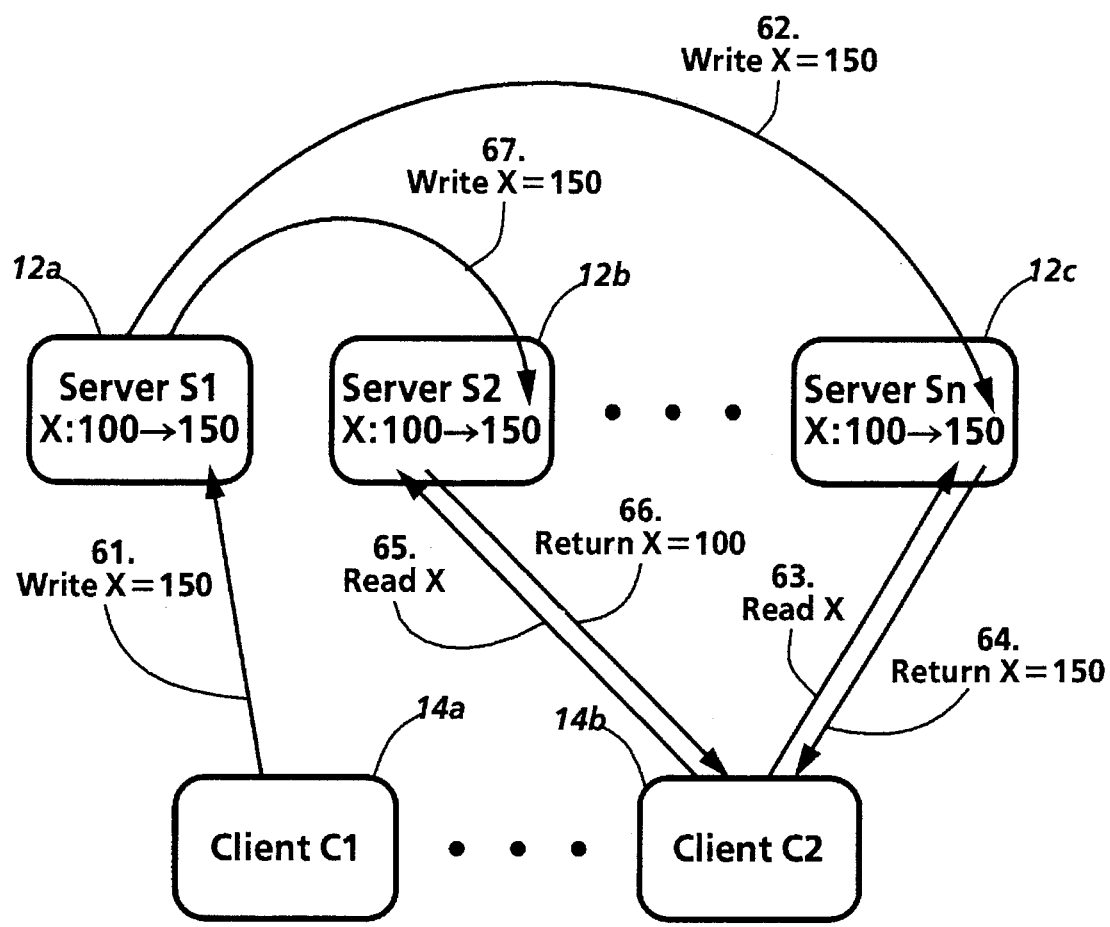
FIGS. 6 and 7 depict a client transaction where the Monotonic Reads guarantee has not and has been selected, respectively.
Figure 7:
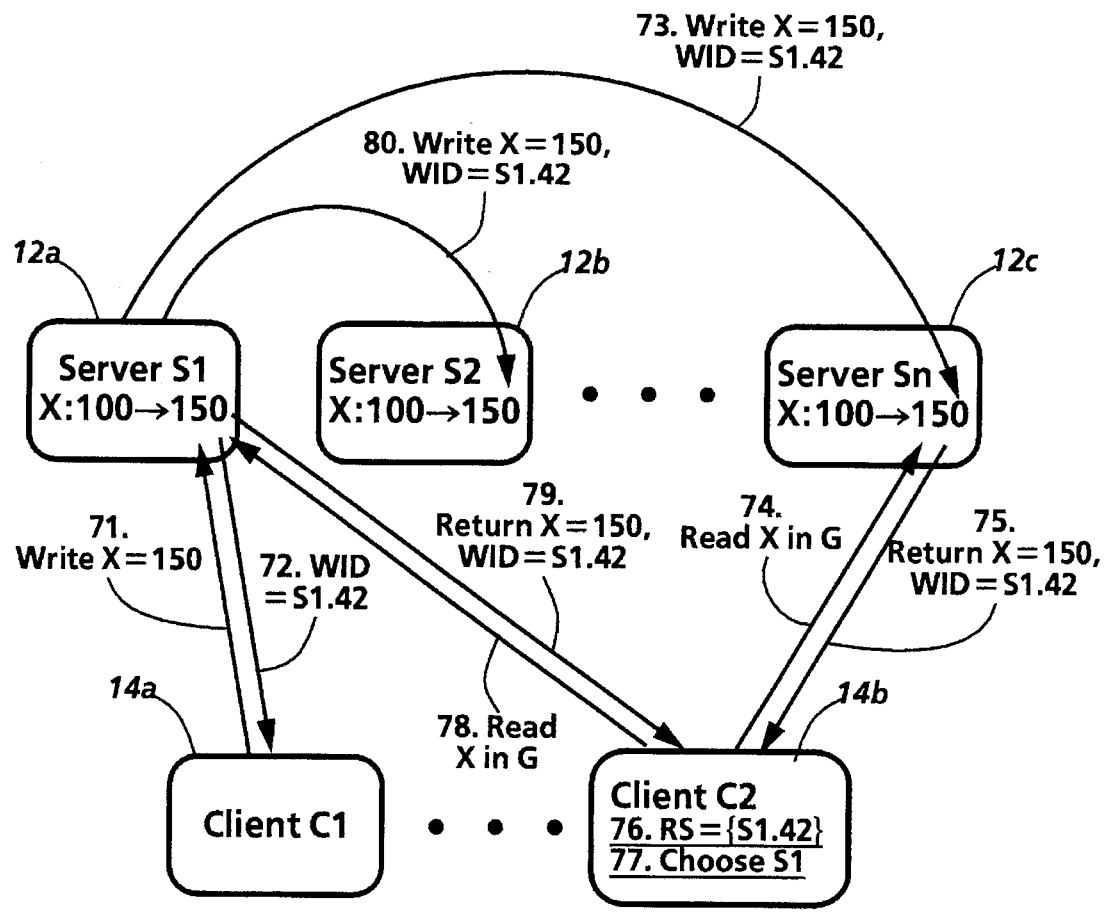

FIGS. 6 and 7 graphically depict the MR guarantee as applied in a exemplary client request. FIG. 6 depicts the result where the client has not selected the MR guarantee:

Step 61: C1 updates his savings account to reflect a new balance of $150 from $100 at ATM server S1.

Step 62: S1 "lazily" propagates the change to server Sn.

Steps 63 and 64: A different client C2 subsequently "Reads" C1's account balance at Sn and receives the "new" account balance of $150.

Steps 65 and 66: Assuming the C2 has forgotten the balance, C2 attempts to Read the balance at S2 and receives the "old" balance of $100.

Step 67: At some future time, S1 lazily propagates the update to S2.

At steps 65 and 66, an inconsistent view of the database is presented to C2. The system "allowed" a client (C2) to Read data that had been read earlier without ensuring that the subsequent Read was at least as up-to-date as the earlier Read.

FIG. 7 shows the same scenario depicted in FIG. 6; but with the MR guarantee enforced. FIG. 7 assumes that client C2 executes the following program:

G=Start_Session (MR);
Value:=Read (G,X);
_Value=Read (G,X);
End_Session (G);

Step 71 and 72: C1 "starts" a session G and Writes a new balance to S1 of $150. S1 returns a unique WID for the Write.

Step 73: S1 lazily propagates the update to Sn, together with the WID.

Step 74 and 75: C2 Reads the balance from Sn. Sn returns the balance in response to the request, together with the WID associated with the result.

Step 76: C2 places the WID into its Read_Set stored at its session state.

Step 77: At some later time, C2 wants another copy of the balance and "discovers" that only S1 and Sn are "sufficiently" up-to-date.

Step 78 and 79: C2 makes a Read request of S1 for the balance. S1 returns the balance, together with the WID.

Step 80: S1 updates S2 at a later time, together with the WID.

At step 77, the C2's discovery that S1 and Sn are the only servers "sufficiently" up-to-date involves the same discovery process as that described above for the RYW guarantee. The only difference is that the MR guarantee looks to the client's Read_Set (instead of its Write_Set) against which to compare the server WIDs.

Thus, providing the Monotonic Reads guarantee is similar to Read Your Writes in that before each Read to server S at time t, the session manager must ensure that the read-set is a subset of DB(S,t). Additionally, after each Read R to server S, the WIDs for each Write in RelevantWrites(S,t,R) should be added to the session's read-set. This presumes that the server can compute the relevant Writes and return this information along with the Read result.

2.2.3 "Writes Follow Reads" Guarantee (WFR)

The Writes Follow Reads guarantee ensures that traditional Write/Read dependencies are preserved in the ordering of Writes at all servers. That is, in every copy of the database, Writes made during the session are ordered after any Writes whose effects were seen by previous Reads in the session.

WFR-guarantee: If Read R1 precedes Write W2 in a session and R1 is performed at server S1 at time t1, then, for any server S2, if W2 is in DB(S2) then any W1 in RelevantWrites(S1,t1,R1) is also in DB(S2) and WriteOrder(W1, W2).

This guarantee is different in nature from the previous two guarantees in that it affects users outside the session. Not only does the session observe that the Writes it performs occur after any Writes it had previously seen, but also all other clients will see the same ordering of these Writes regardless of whether they request session guarantees.

EXAMPLE 5

Consider a shared bibliographic database to which users contribute entries describing published papers. Suppose that a user reads some entry, discovers that it is inaccurate, and then issues a Write to update the entry. For instance, the person might discover that the page numbers for a paper are wrong and then correct them with a Write such as "UPDATE bibdb SET pages='45–53' WHERE bibid='Jones93'." The WFR-guarantee can ensure that the new Write updates the previous bibliographic entry at all servers.

The WFR-guarantee, as defined, associates two constraints on Write operations. A constraint on "Write order" ensures that a Write properly follows previous relevant Writes in the global ordering that all database replicas will eventually reflect. A constraint on "propagation" ensures that all servers (and hence all clients) only see a Write after they have seen all the previous Writes on which it depends. Example 5 requires both of these constraints. Some applications, however, may require only one of them. For such applications, systems may wish to provide relaxed variants of the Writes Follow Reads guarantee, one to guarantee how Writes are ordered and the other to guarantee how they propagate among servers:

WFRO-guarantee ("Order" constraint): If Read R1 precedes Write W2 in a session and R1 is performed at server S1 at time t1, then WriteOrder(W1,W2) for any W1 in RelevantWrites(S1,t1,R1).

WFRP-guarantee ("Propagation" constraint): If Read R1 precedes Write W2 in a session and R1 is performed at server S1 at time t1, then, for any server S2, if W2 is in DB(S2) then any W1 in RelevantWrites(S1,t1,R1) is also in DB(S2).

EXAMPLE 6

Consider a weakly consistent replicated bulletin board database that requires users to post articles or to reply to articles by performing database Writes. The WFRP-guarantee can be used within this system to ensure that users see the replies to a posted article only after they have seen the original. A user who replies to an article can only issue the reply in the same session in which the article is read. Users who are only reading articles need not request any guarantees. While the full WFR-guarantee would suffice for this application, the ordering property is not necessary since the posting of an article and the posting of a reply are commutative operations as far as the database is concerned.

EXAMPLE 7

Consider the shared bibliographic database discussed in Example 5. Suppose that Write operations always contain complete bibliographic entries rather than partial updates. For instance, to update the page numbers in an entry, a user would read the previous entry, correct the "pages" field and then Write back the full updated entry including all of the unmodified fields. In this case, the WFRO-guarantee could be used instead of the WFR-guarantee. The reason is that permitting users to see the newest version of a bibliography entry is acceptable even if older versions have not yet reached the server they are using.

Figure 8:
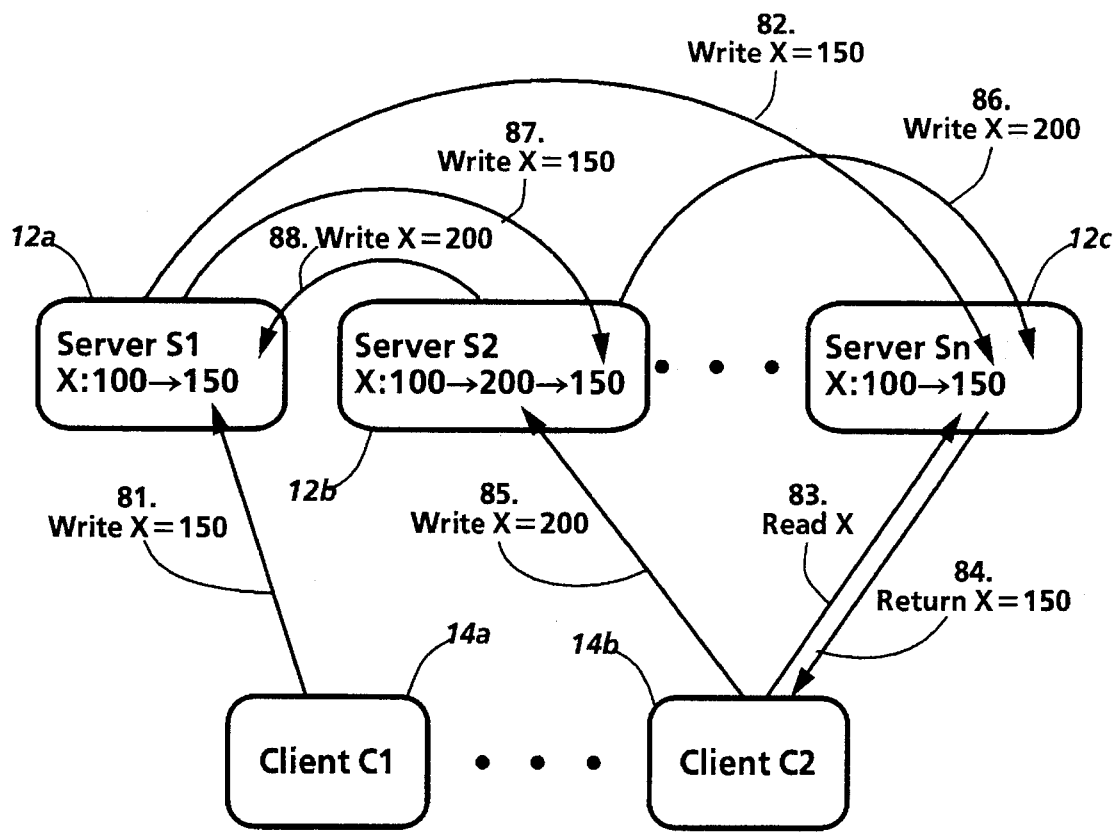
FIGS. 8 and 9 depict a client transaction where the Writes Follow Reads guarantee has not and has been selected, respectively.
Figure 9:
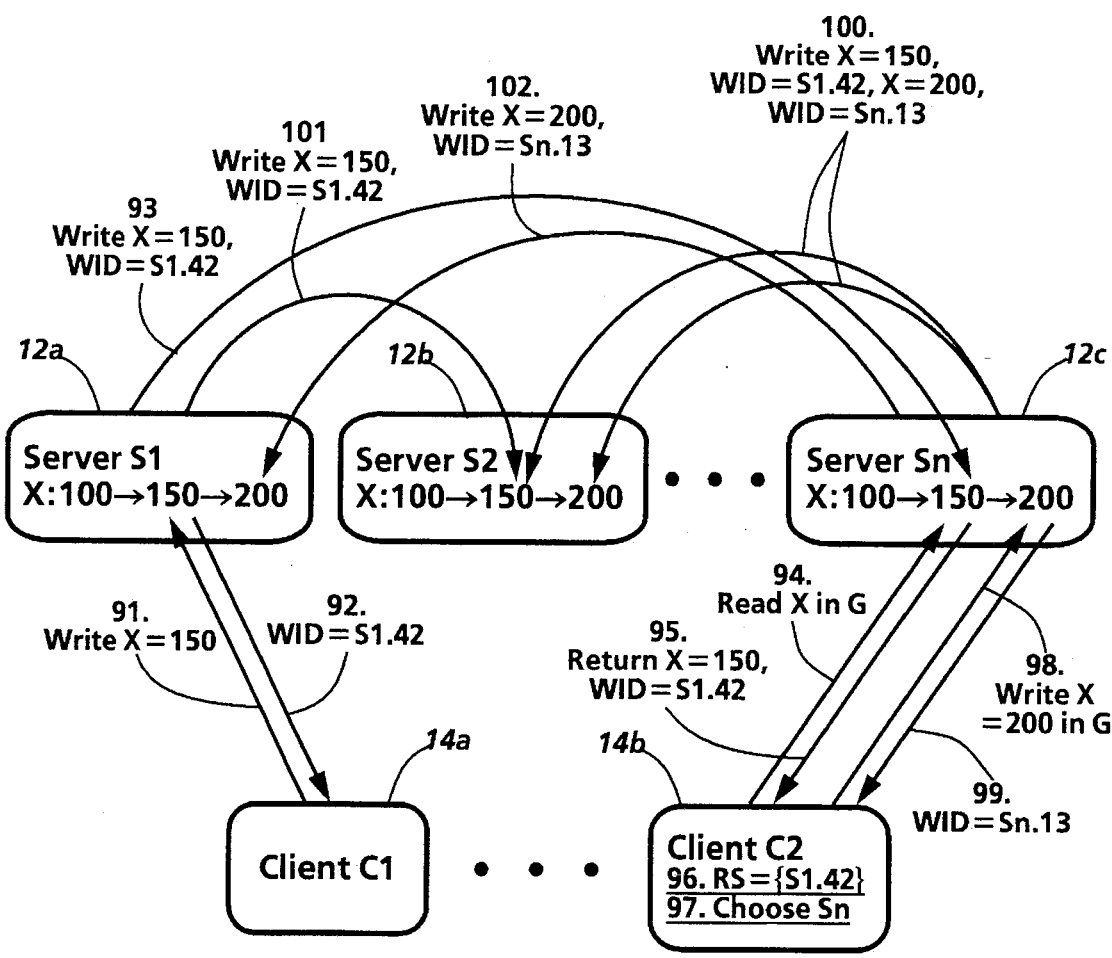

FIGS. 8 and 9 graphically depict the WFR guarantee as applied in a exemplary client request. FIG. 8 depicts the results without the WFR guarantee enforced:

Step 81: C1 updates his savings account to reflect a new balance of $150 from $100 at ATM server S1.

Step 82: S1 "lazily" propagates the change to server Sn.

Steps 83 and 84: A different client C2 subsequently "Reads" C1's account balance at Sn and receives the account balance of $150.

Step 85: C2 Writes a new balance of $200 to S2.

Step 86: S2 propagates the value $200 to Sn. At this point, Sn has received two updates for the balance: $150 from C1 and $200 from C2. Sn uses a pre-determined algorithm to order the update from C1 after the update from C2, leaving a value $150.

Step 87: S1 propagates the value $150 to S2. At this point, S2 has received two updates for the balance: $150 from C1 and $200 from C2. S2 uses a pre-determined algorithm to order the update from C1 after the update from C2, leaving a value $150.

Step 88: S2 propagates the value $200 to S1. At this point, S1 has received two updates for the balance: $150 from C1 and $200 from C2. S1 uses a pre-determined algorithm to order the update from C1 after the update from C2, leaving a value $150.

After step 87, the current version of the balance at S2 is actually a version which predates the correct current balance.

FIG. 9 shows the same scenario depicted in FIG. 8; but with the WFR guarantee enforced. FIG. 9 assumes that client C2 executes the following program:

G=Start__Session (WFR);
Value:=Read (G,X);
Write (G,X, Value+50);
End__Session (G);

Step 91 and 92: C1 "starts" a session G and Writes a new balance to S1 of $150. S1 returns a unique WID for the Write.

Step 93: S1 lazily propagates the update to Sn, together with the WID.

Step 94 and 95: C2 Reads the balance from Sn. Sn returns the balance in response to the request, together with the WID associated with the results.

Step 96: C2 places the WID into its Read__Set stored at its session state.

Step 97: At some later time, C2 wants to update the balance and "discovers" that only S1 and Sn are "sufficiently" up-to-date.

Step 98 and 99: C2 makes a Write request of Sn for the balance. Sn returns the unique WID.

Step 100: Sn updates S2 at a later time by passing along both Writes serviced at S1 and Sn, together with their WIDs. It will be noted that the Writes are presented in their WriteOrder.

Step 101: S1 updates S2 by passing along its updated data, together with its WID. S2 notes that it has already seen this WID and does not reprocess the update.

Step 102: Sn subsequently updates S1 with its updated data and unique WID.

As can be seen from the above examples, unlike the Read Your Writes and Monotonic Reads guarantees, implementing the Writes Follow Reads guarantee requires placing two additional, but reasonable, constraints on the servers' behavior:

Constraint 1.

When a server S accepts from a client a new Write W2 at time t, it ensures that WriteOrder(W1,W2) is true for any W1 already in DB(S,t). That is, new Writes are ordered after Writes that are already known to a server.

Constraint 2.

Lazy propagation is performed such that if W2 is propagated from server S1 to server S2 at time t, then any W1 in DB(S1,t) such that WriteOrder(W1,W2) holds has also propagated to S2.

Actually, these requirements as stated are slightly stronger than needed for the guarantees. Strictly speaking, these two constraints must hold for any Write W1 in the session's read-set or write-set rather than for any Write in DB(S,t). This subtle distinction is not likely to have a practical consequence since the weaker requirements would require a server to keep track of clients' read-sets and write-sets. The stronger requirements allow a server's behavior to be independent of the session state maintained by clients.

Fortunately, these constraints are already implemented in many systems providing weakly consistent replicated data. In general, ordering new Writes after previous Writes, as requested in Constraint 1, is a desirable system property. Moreover, it is easy to ensure. If the WriteOrder predicate is computed by comparing timestamps, for instance, then a new Write must simply be timestamped later than previous Writes received by the server. Constraint 2, in practice, means that either servers atomically transfer their complete databases during lazy propagation or else they transfer Writes according to the order that these Writes were applied to their database.

Given these constraints on servers' behavior, the Writes Follow Reads guarantee can be provided as follows. As with Monotonic Reads, each Read R to server S at time t results in RelevantWrites(S,t,R) being added to the session's read-set. Before each Write to server S at time t, the session manager checks that this read-set is a subset of DB(S,t).

2.2.4 "Monotonic Writes" Guarantee (MW)

The Monotonic Writes guarantee says that Writes must follow previous Writes within the session. In other words, a Write is only incorporated into a server's database copy if the copy includes all previous session Writes; the Write is ordered after the previous Writes.

MW-guarantee: If Write W1 precedes Write W2 in a session, then, for any server S2, if W2 in DB(S2) then W1 is also in DB(S2) and WriteOrder(W1,W2).

This guarantee provides assurances that are relevant both to the user of a session as well as to users outside the session. As with the Writes Follow Reads guarantee, one could define two variants that allow applications to separately control Write order and Write propagation.

EXAMPLE 8

The MW-guarantee could be used by a text editor when editing replicated files to ensure that if the user saves version N of the file and later saves version N+1 then version N+1 will replace version N at all servers. In particular, it avoids the situation in which version N is written to some server and version N+1 to a different server and the versions get propagated such that version N is applied after N+1.

EXAMPLE 9

Consider a replicated database containing software source code. Suppose that a programmer updates a library to add functionality in an upward compatible way. This new library can be propagated to other servers in a lazy fashion since it will not cause any existing client software to break. However, suppose that the programmer also updates an application to make use of the new library functionality. In this case, if the new application code gets written to servers that have not yet received the new library, then the code will not compile successfully. To avoid this potential problem, the programmer can create a new session that provides the MW-guarantee and issue the Writes containing new versions of both the library and application code within this session.

Figure 10:
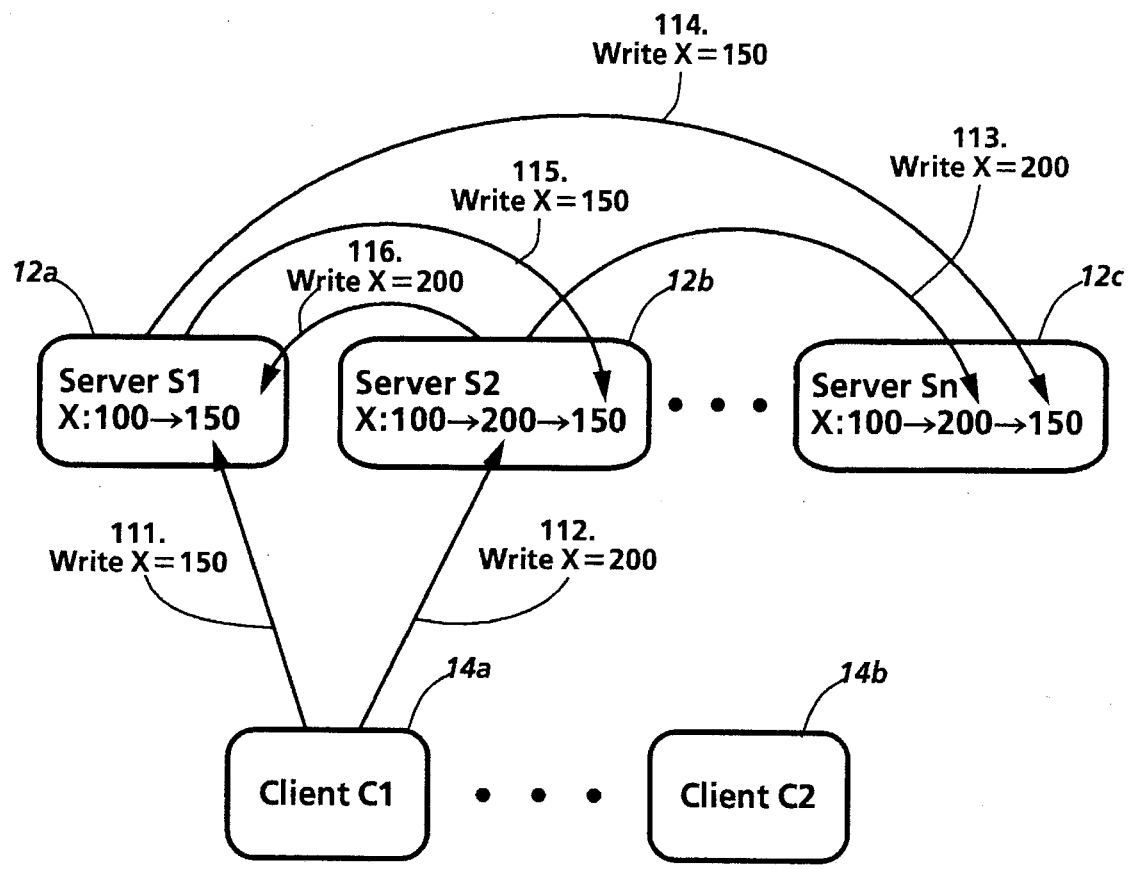
FIGS. 10 and 11 depict a client transaction where the Monotonic Writes guarantee has not and has been selected, respectively.
Figure 11:
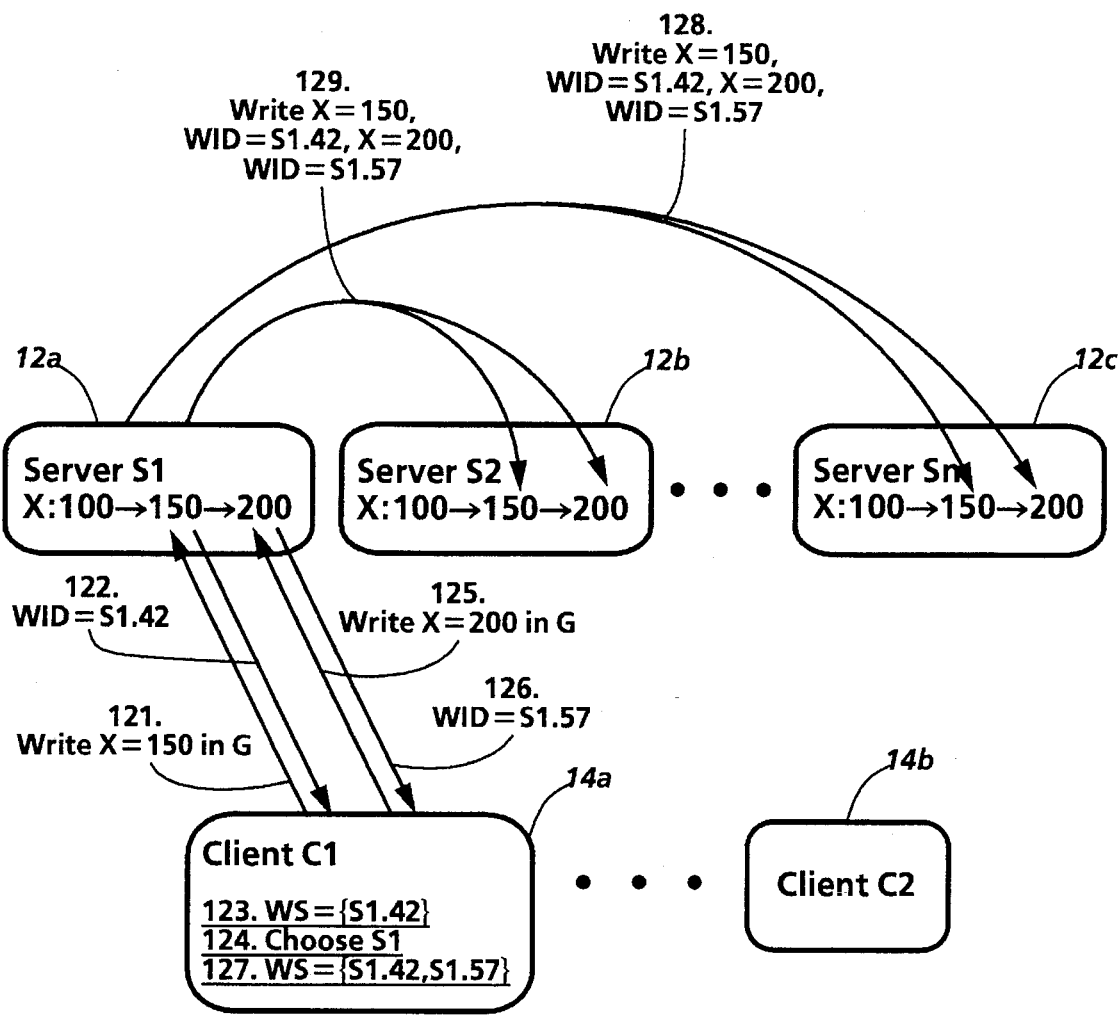

FIGS. 10 and 11 depict the client transaction with the MW guarantee not enforced and enforced, respectively. Specifically, FIG. 10 depicts a client transaction with the following steps:

Step 111: C1 updates his savings account to reflect a new balance of $150 from $100 at S1.

Step 112: C1 updates the same account at S2 to reflect a balance of $200.

Step 113: S2 "lazily" propagates its update of value $200 to Sn

Step 114 and 115: S1 propagates the value $150 to Sn. At this point, Sn has received two updates for the balance: $150 from S1 and $200 from S2. Sn uses a predetermined algorithm to order the update from S1 after the update from S2, leaving a value $150. Similarly, S1 propagates a value of $150 to S2, resulting in a final balance of $150 at S2.

Step 116: S2 propagates the value $200 to S1. At this point, S1 has received two updates for the balance: $150 from C1 and $200 from S2. S1 uses a predetermined algorithm to order the update from C1 after the update from S2, leaving a value $150.

At steps 114 and 115, an inconsistency is introduced into the database. The system "allowed" an old data value to be propagated and incorporated into a server's database—overwriting newer updates.

FIG. 11 shows the same scenario; but with the MW guarantee enforced. FIG. 11 assumes that client C2 executes the following program:

G=Start_Session (MW);
Write (G,X,150);
Write (G,X,200);
End_Session (G);

Step 121, 122, and 123: C1 Writes a new balance to S1 of $150. S1 returns a unique WID for the Write. C1 places the WID in its Write_Set.

Step 124: C1 desires to update the balance again and discovers that it must Write to S1 because the other servers have not been updated.

Step 125, 126, and 127: C2 Writes a new balance of $200. S1 returns a unique WID for the Write. C1 places the WID into its Write_Set for the session.

Step 128: S1 propagates the two updates, together with their WIDs to Sn.

Step 129: S1 propagates the two updates, together with their WIDs to S2.

As with the Writes Follows Reads guarantee, the Monotonic Writes guarantee requires the same additional constraints on server behavior. Once the constraints are in place, providing the Monotonic Writes involves two steps. In order for a server S to accept a Write at time t, the server's database, DB(S,t), must include the session's write-set. Also, whenever a Write is accepted by a server, its assigned WID is added to the write-set.

Having now formally defined that the above four data guarantees and having given suitable examples to illustrate the guarantees, the manner of implementing and enforcing the guarantees will be described.

2.3 Implementation and Enforcement of Guarantees

2.3.1 Implementation Using Version Vectors

The implementations discussed in the previous section follow straightforwardly from the definitions of the guarantees, but have several practical problems:

1) The session state, i.e. the set of WIDs maintained for a session, could get large over time.
2) The set of relevant WIDs returned from a Read operation could get large.
3) The set of WIDs checked on a Read or Write operation could get large.
4) The information used by servers to record the Writes they have seen could be large.
5) Finding a suitable server, including checking that a server's database contains all of the necessary Writes, could be expensive.
6) The bookkeeping required of servers to determine the relevant Writes for a Read could be excessive.

The use of version vectors allows for a more efficient implementation of the four guarantees. Version vectors, which are used by several systems to detect Write conflicts, can alleviate many of these problems. As previously mentioned, a version vector is a sequence of <server, clock> pairs, one for each server. The server portion is simply a unique identifier for a particular copy of the replicated database. The clock is a value from the given server's monotonically increasing logical clock. The only constraint on this logical clock is that it must increase for each Write accepted by the server; for instance, it could be a Lamport clock, a real-time clock or simply a counter. A <server, clock> pair serves nicely as a WID, and this section assumes that WIDs are assigned in this manner by the server that first accepts the Write.

Each server maintains its own version vector with the following invariant: if a server has <S,c> in its version vector, then it has received all Writes that were assigned a WID by server S before or at logical time c on S's clock. For this invariant to hold, servers must transfer Writes in the order of their assigned WIDs during lazy propagation. A server's version vector is updated as part of the lazy propagation process so that it precisely specifies the set of Writes in its database.

Through the use of version vectors, a more practical implementation of the guarantees is possible in which the sets of WIDs are replaced by version vectors as follows:

1) To obtain a version vector V that provides a compact representation for a set of WIDs, Ws, set V[S]=the time of the latest WID assigned by server S in Ws (or 0 if no Writes are from S).
2) To obtain a version vector V that represents the union of two sets of WIDs, Ws1 and Ws2, first obtain V1 from Ws1 and V2 from Ws2 as above. Then, set V[S]=MAX(VI[S], V2[S]) for all S.
3) To check if one set of WIDs, Ws1, is a subset of another, Ws2, first obtain V1 from Ws1 and V2 from Ws2 as above. Then, check to see if V2 "dominates" V1, where dominance is defined as one vector being greater or equal to the other in each corresponding component.

Figure 15:
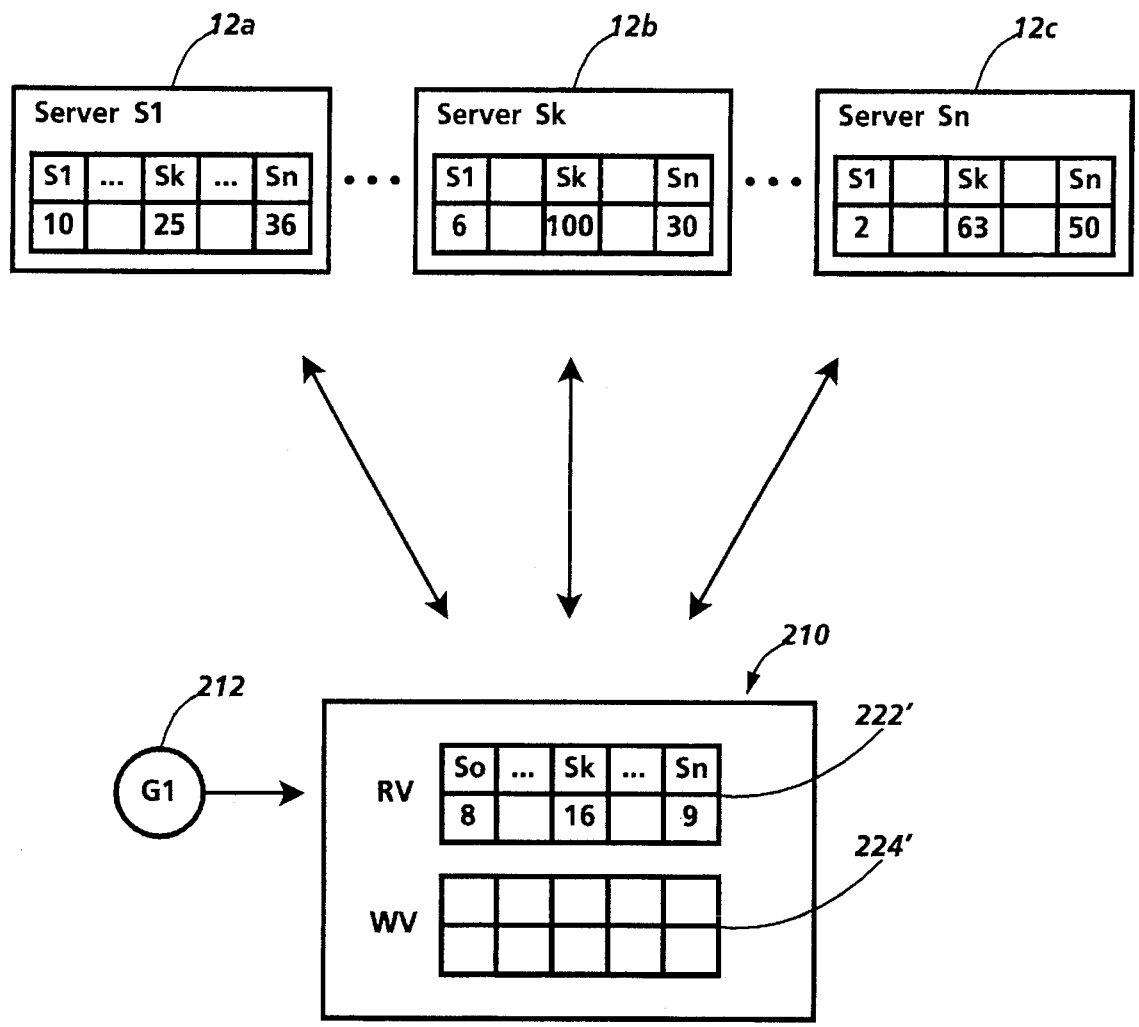
FIG. 15 depicts the use of version vectors in determining which servers are sufficiently up-to-date.

FIG. 15 depicts the use of version vectors in the selection of a suitably "up-to-date" server. As shown, the state maintained for session G1 212 comprises two version vectors: one to record the session's Writes (WV 224') and one to record the session's Reads (RV 222') (i.e. the Writes that are "relevant" to the session's Reads). To find an acceptable server, the session manager must check that one or both of these session vectors are dominated by the server's version vector. Which session vectors are checked depends on the operation being performed and the guarantees being provided within the session. In FIG. 15, only S1's (12a) version vector dominates RV 222' of session G1. The Writes "seen" by S1 from other servers is at least as up-to-date as the Writes seen by Session G1. Sk's (12b) version vector fails to dominate because it has not seen as many Writes from S1 as session G1. Similarly, Sn's (12c) version vector fails because it also has not seen as many Writes from S1.

Servers return a version vector along with Read results to indicate the relevant Writes. In practice, servers may have difficulty computing the set of relevant Writes. For one thing, determining the relevant Writes for a complex query, such as one written in SQL, may be costly. For another, it may require servers to maintain substantial bookkeeping of which Writes produced or deleted which database items. In real systems, servers typically do not remember deleted database entries; they just store a copy of the database along with a version vector. For such systems, a server is allowed to return its current version vector as a gross estimation of the relevant Writes. This does not violate the Monotonic Reads or Writes Follow Reads guarantees, it merely causes the session manager to be overly conservative when choosing acceptable servers.

2.3.2 Enforcement of Guarantees

Figure 12:
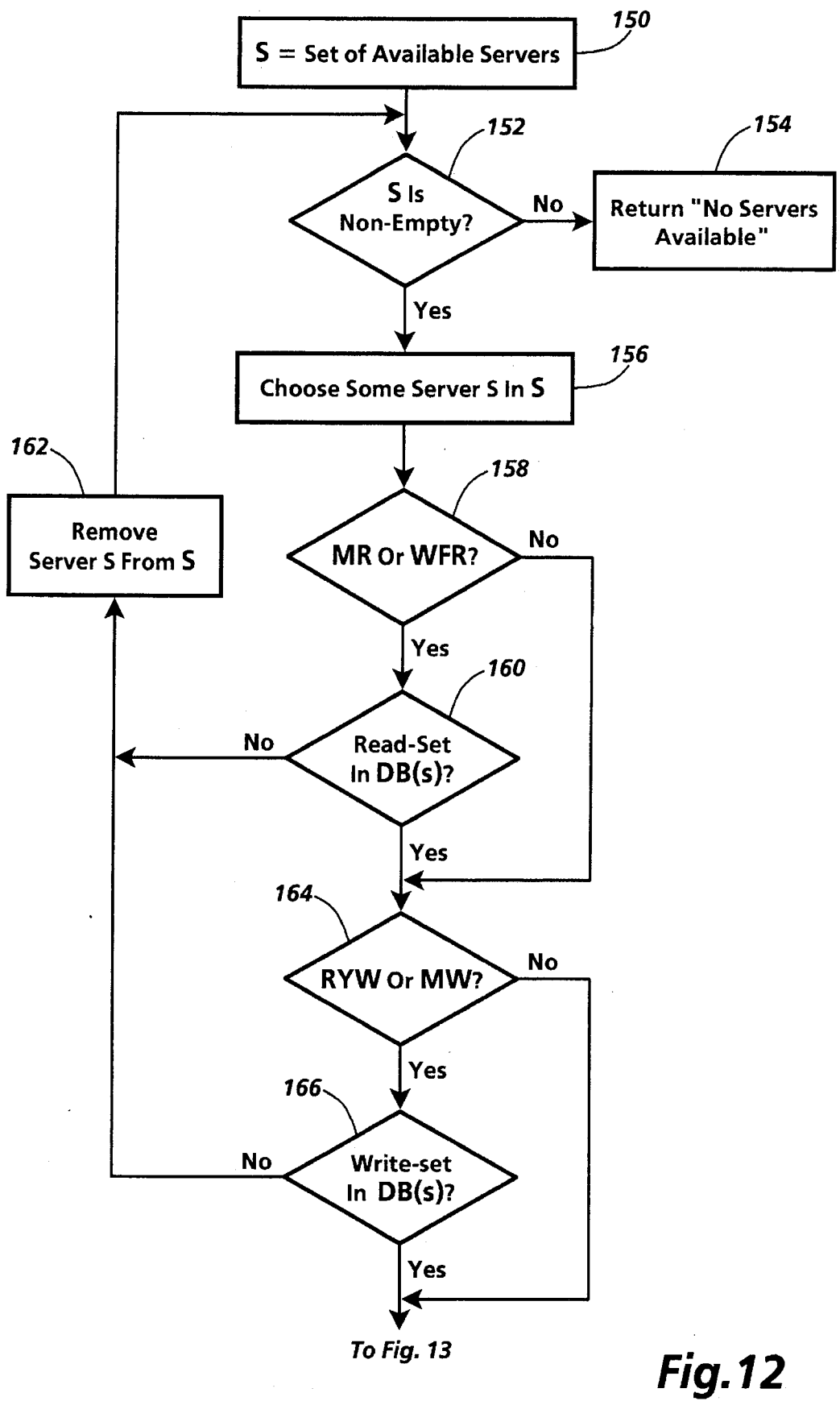
FIG. 12 and 13 is a flowchart of the discover and enforce mechanism performed by the session manager.
Figure 13:
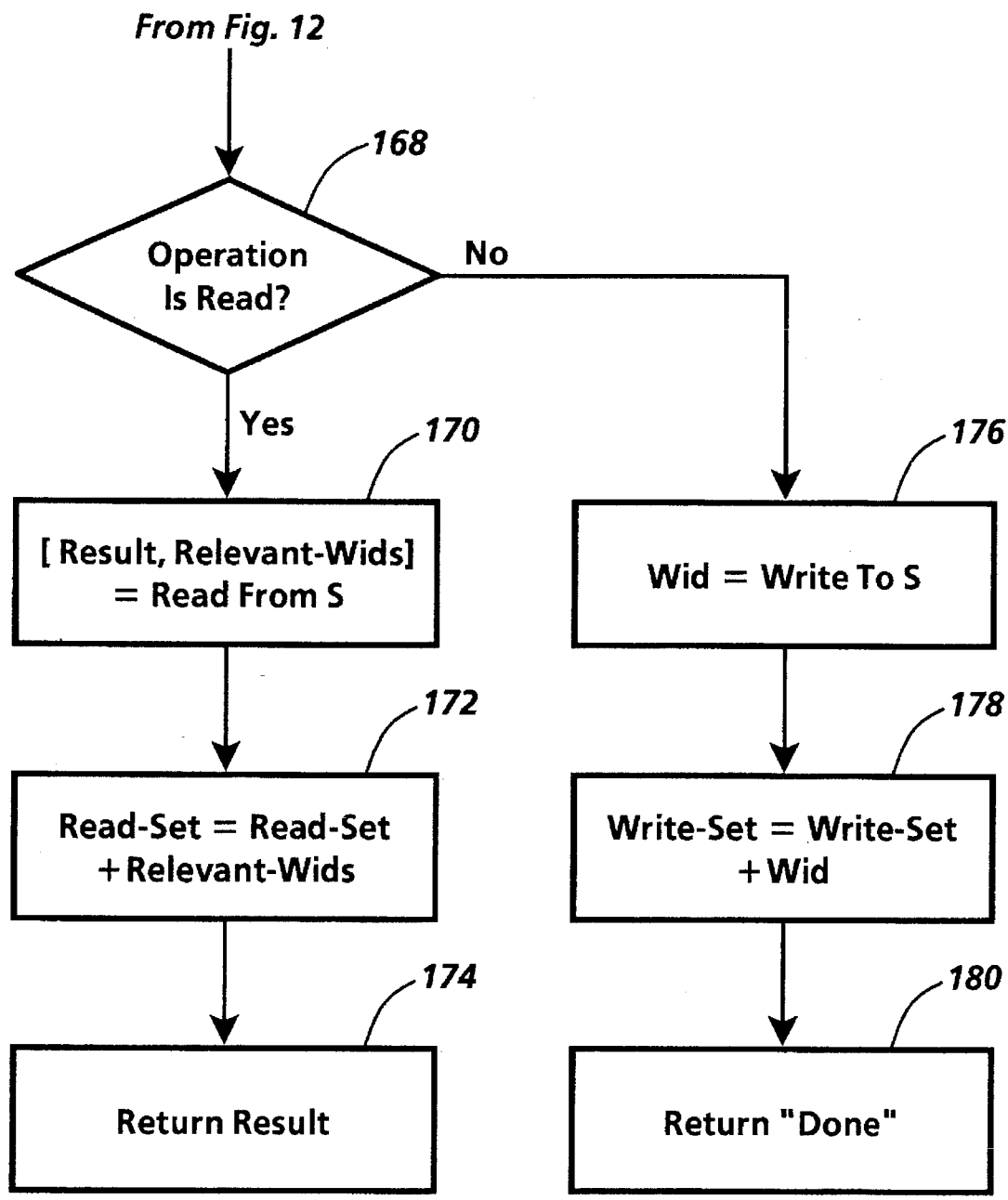

The procedure for enforcing the guarantees at the session manager is shown in FIGS. 12 and 13. Each Read and Write request that is issued during any given session is processed in accordance with this procedure. Essentially, the procedure starts with the entire set of available (i.e. reachable) servers (step 150) and, depending on which guarantees have been selected, the session Read_Set (and Write_Set) is compared with the Writes (i.e. DB(S)) that have occurred in a given server, S (steps 160 and 166). If the session Read_Set (or Write_Set) is not in DB(S), then S is not a suitable server (step 162) to process the client's request (i.e. the guarantee is not satisfied for that server). If there is a suitable server (step 168), then the Read (or Write) request is processed at that server (steps 170 et seq. or 176 et seq., respectively).

To change this procedure to conform to version vector implementation, only a few changes are necessary:

Step 160: Check if server's version vector "dominates" the session's Read vector.

Step 166: Check if server's version vector "dominates" the session's Write vector.

Step 172: Session Read vector:=Max (Read vector, RelevantWrite vector);

Step 178: Session's Write vector [S]:=WID.clock.

As an additional performance improvement, the checks for a suitable server can be amortized over many operations within a session. In particular, the previously contacted server is always an acceptable choice for the server at which to perform the next Read or Write operation. Thus, if the session manager "latches on" to a given server, then the checks can be skipped. Only when the session manager switches to a different server, like when the previous server becomes unavailable, must a server's current version vector be compared to the session's vectors. To facilitate finding a server that is sufficiently up-to-date, the session manager can cache the version vectors of various servers. Since a server's database can only grow over time in terms of the numbers of Writes it has received and incorporated, cached version vectors represent a lower bound on a server's knowledge.

Caching of data at clients can also be used to improve overall performance and data availability. However, it will be appreciated that circumstances may exist under which data that is available in the cache cannot be read by an application because it does not meet the application's session guarantees. For example, this situation can arise when applications with different consistency requirements are sharing the cache. Suppose a client machine is executing two applications, a mail reader and a program that collects statistics on the mail messages that the user receives. The statistics gathering program has no consistency requirements and hence requests no session guarantees. On the other hand, the mail reader requires the Monotonic Reads and Read Your Writes guarantees as explained in Examples 2 and 4. Assume that at some point the statistics program reads from a server that holds an out-dated copy of the user's mail database, thereby filling the cache with old data. When the mail reader executes, allowing it to retrieve data from the cache would likely violate its Monotonic Reads guarantee. It is important to point out that this type of scenario can occur for any weakly consistent replicated system with client caching, regardless of the existence of mobile clients.

What is claimed:

1. In a database system having a plurality of servers, a plurality of clients, where at least some of said clients may access different servers at different times, including times when said servers contain inconsistent data values; said servers storing weakly consistent replicated data; said data being accessible and updatable by said clients; and said data, once updated, being propagated by servers having said updated data to servers that do not have said updated data: a method for providing relevant consistency guarantees for said data to every client participating in any session on a per session basis with respect to access and update requests belonging to each respective session, the steps of said method comprising:

A) defining a plurality of sessions, such that each of said sessions is composed of database access and update requests of at least one client;

B) selecting a client specified relevant subset of consistency guarantees for each session from a set of predefined, mutually distinguishable guarantees, where the relevancy of a given guarantee is decided by at least one of said clients; and C) enforcing the selected guarantees for said at least one client during the course of said session even when said at least one client accesses different servers during the session.

2. The method for providing consistency guarantees as recited in claim 1 wherein the step of defining a session further comprises the step of initiating a session.

3. The method for providing consistency guarantees as recited in claim 1 wherein the step of defining a session further comprises the step of terminating a session.

4. The method for providing consistency guarantees as recited in claim 1 wherein the step of defining a session further comprises the step of cloning a session.

5. The method for providing consistency guarantees as recited in claim 1 wherein the step of defining a session further comprises the step of merging at least two sessions.

6. The method for providing consistency guarantees as recited in claim 1 wherein the step of defining a session further comprises the step of downgrading the set of guarantees during the course of a session.

7. The method for providing consistency guarantees as recited in claim 1 wherein said clients update data and access data at said servers by issuing a WRITE and a READ command respectively.

8. The method for providing consistency guarantees as recited in claim 7 wherein one of said session guarantees comprises the condition:

if Read R follows Write W in a session and R is performed at server S at time t, then W is included in DB(S,t).

9. The method for providing consistency guarantees as recited in claim 7 wherein one of said session guarantees comprises the condition:

if Read R1 occurs before R2 in a session and R1 accesses server S1 at time t1 and R2 accesses server S2 at time t2, then RelevantWrites(S1,t1,R1) is a subset of DB(S2, t2).

10. The method for providing consistency guarantees as recited in claim 7 wherein one of said session guarantees comprises the condition:

if Read R1 precedes Write W2 in a session and R1 is performed at server S1 at time t1, then, for any server S2, if W2 is in DB(S2) then any W1 in RelevantWrites(S1,t1,R1) is also in DB(S2) and WriteOrder(W1, W2).

11. The method for providing consistency guarantees as recited in claim 7 wherein one of said session guarantees comprises the condition:

if Read R1 precedes Write W2 in a session and R1 is performed at server S1 at time t1, then, for any server S2, if W2 is in DB(S2) then any W1 in RelevantWrites(S1,t1,R1) is also in DB(S2).

12. The method for providing consistency guarantees as recited in claim 7 wherein one of said session guarantees comprises the condition:

if Read R1 precedes Write W2 in a session and R1 is performed at server S1 at time t1, then, for any server S2, if W2 is in DB(S2) then, for any W1 in RelevantWrites(S1,t1,R1), WriteOrder(W1,W2).

13. The method for providing consistency guarantees as recited in claim 7 wherein one of said session guarantees comprises the condition:

if Write W1 precedes Write W2 in a session, then, for any server S2, if W2 in DB(S2) then W1 is also in DB(S2) and WriteOrder(W1,W2).

14. The method for providing consistency guarantees as recited in claim 7 wherein one of said session guarantees comprises the condition:

if Write W1 precedes Write W2 in a session, then, for any server S2, if W2 in DB(S2) then W1 is also in DB(S2).

15. The method for providing consistency guarantees as recited in claim 7 wherein one of said session guarantees comprises the condition:

if Write W1 precedes Write W2 in a session, then, for any server S2, if W2 in DB(S2) then WriteOrder(W1,W2).

16. The method for providing consistency guarantees as recited in claim 1 wherein the step of enforcing the guarantees further comprises the steps of:

locating at least one reachable server; and discovering whether said at least one reachable server satisfies the selected guarantees.

17. The method for providing consistency guarantees as recited in claim 16 wherein the step of discovering further comprises the step of informing the client if no suitable server is found.

* * * * *